(12) United States Patent
Hioki

(10) Patent No.: US 12,722,395 B2
(45) Date of Patent: Sep. 1, 2026

(54) METHOD FOR ADJUSTING INKJET PRINTER, PROGRAM, AND PRINTING SYSTEM

(71) Applicant: MIMAKI ENGINEERING CO., LTD., Nagano (JP)

(72) Inventor: Wataru Hioki, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 62 days.

(21) Appl. No.: 18/715,730

(22) PCT Filed: Dec. 8, 2022

(86) PCT No.: PCT/JP2022/045363
§ 371 (c)(1),
(2) Date: Jun. 2, 2024

(87) PCT Pub. No.: WO2023/112836
PCT Pub. Date: Jun. 22, 2023

(65) Prior Publication Data

US 2025/0050654 A1 Feb. 13, 2025

(30) Foreign Application Priority Data

Dec. 15, 2021 (JP) ................................ 2021-203672

(51) Int. Cl.
*B41J 2/21* (2006.01)
*B41J 2/045* (2006.01)
(Continued)

(52) U.S. Cl.
CPC ........... *B41J 2/2135* (2013.01); *B41J 2/0451* (2013.01); *B41J 2/0457* (2013.01);
(Continued)

(58) Field of Classification Search
CPC ...... B41J 2/2135; B41J 2/0451; B41J 2/0457; B41J 2/04581; B41J 2/2121; B41J 2/2139;
(Continued)

(56) References Cited

U.S. PATENT DOCUMENTS 6,523,926 B1 2/2003 Mitsuzawa et al.
2020/0230951 A1 7/2020 Kobayashi

FOREIGN PATENT DOCUMENTS

CN 102248783 11/2011
CN 105026159 11/2015
(Continued)

OTHER PUBLICATIONS

"International Search Report (Form PCT/ISA/210) of PCT/JP2022/045363", mailed on Feb. 28, 2023, with English translation thereof, pp. 1-6.

(Continued)

*Primary Examiner* — Kristal Feggins
(74) *Attorney, Agent, or Firm* — JCIPRNET

(57) ABSTRACT

A method for adjusting a printing apparatus includes an analyzing stage of performing, by an image analysis apparatus, analysis on a pattern image generated by reading a test pattern by a scanner, and a setting value updating stage of updating a control setting value stored in a database, in which the printing apparatus is caused to print a test pattern including a pattern for ejecting ink from a plurality of nozzle rows to the same position in a main scanning direction, in the analyzing stage, a dot position misalignment amount occurring in each nozzle row is detected by image processing based on the pattern image, a dot position correction value corresponding to the dot position misalignment amount is calculated by calculation, and in the setting value updating (Continued)

stage, the database is caused to store the dot position correction value as at least a part of the control setting value.

17 Claims, 8 Drawing Sheets

(51) Int. Cl.
*G06T 7/00* (2017.01)
*G06T 7/73* (2017.01)

(52) U.S. Cl.
CPC ......... *B41J 2/04581* (2013.01); *B41J 2/2121* (2013.01); *B41J 2/2139* (2013.01); *B41J 2/2142* (2013.01); *G06T 7/0004* (2013.01); *G06T 7/73* (2017.01); *G06T 2207/10008* (2013.01); *G06T 2207/30144* (2013.01)

(58) Field of Classification Search
CPC . B41J 2/2142; B41J 19/145; B41J 2/01; B41J 2029/3935; B41J 2/205; B41J 29/393; B41J 2/04505; B41J 2/04503; B41J 2/04506; B41J 2/04508; B41J 2/0452; B41J 2/04525; B41J 2/04526; B41J 2/04535; B41J 2/04536; B41J 2/04556; B41J 2/04558; B41J 2/0456; B41J 2/04561; B41J 2/04571; G06T 7/0004; G06T 2207/10008; G06T 2207/30144
See application file for complete search history.

(56) References Cited

FOREIGN PATENT DOCUMENTS

| | | | | |
|---|---|---|---|---|
| CN | 109551902 | | 4/2019 | |
| JP | H0569625 | | 3/1993 | |
| JP | 2000062158 | | 2/2000 | |
| JP | 2001038963 | | 2/2001 | |
| JP | 2001121687 | * | 5/2001 | ............ B41J 19/145 |
| JP | 2001301148 | | 10/2001 | |
| JP | WO2011155324 | | 8/2013 | |
| JP | 2014050816 | | 3/2014 | |
| JP | 2020026122 | | 2/2020 | |
| JP | 2020104434 | | 7/2020 | |
| JP | WO2019130532 | | 12/2020 | |

OTHER PUBLICATIONS

"Notification of Reasons for Rejection of Japan Counterpart Application", issued on Apr. 22, 2025, with English translation thereof, p. 1-p. 11.
"Search Report of Europe Counterpart Application", issued on Mar. 11, 2025, p. 1-p. 12.
"The First Office Action of China Counterpart Application", with English translation thereof, issued on Mar. 6, 2026, pp. 1-22.
"The Second Office Action of China Counterpart Application", with English translation thereof, issued on Jun. 9, 2026, pp. 1-20.

* cited by examiner

202

Y

X

212

212

212

212

METHOD FOR ADJUSTING INKJET PRINTER, PROGRAM, AND PRINTING SYSTEM

CROSS-REFERENCE TO RELATED APPLICATION

This application is a 371 application of the International PCT application serial no. PCT/JP2022/045363 filed on Dec. 8, 2022, which claims the priority benefit of Japan Patent Application No. JP 2021-203672 filed on Dec. 15, 2021. The entirety of each of the above-mentioned patent applications is hereby incorporated by reference herein and made a part of this specification.

BACKGROUND

Technical Field

This disclosure relates to a method for adjusting an inkjet printer, a program, and a printing system.

Background Art

In recent years, an inkjet printer, which is a printing apparatus that performs printing using an inkjet head, has been widely used. Conventionally, various methods for performing inspection on the inkjet head are known (see, for example, Patent Literature 1).

The inkjet printer executes printing by ejecting ink from fine nozzles in the inkjet head. In this case, in order to appropriately perform printing with high quality, it is necessary to land the ink with high accuracy on the ink ejection position set according to the resolution of printing. In this regard, for example, Patent Literature 1 discloses a liquid jet recording head hitting point inspecting method that can be executed without mounting a liquid jet recording head onto a recording device body, in which a liquid hit on a recording medium is recognized by an image processing camera and image processing is performed. It is disclosed that by this image processing, a horizontal distance and a vertical distance between a hit liquid droplet and an ejection opening are calculated from the coordinates of the both and an ejection angle of a main droplet and a satellite constituting the liquid droplet is calculated. It is disclosed that data calculated by such measurement is fed back to a recording head manufacturing process and stored in a recording head.

CITATION LIST

Patent Literature

Patent Literature 1: Japanese Unexamined Patent Publication No. 2000-62158

SUMMARY OF DISCLOSURE

Technical Problems

In order to maintain high quality printing, the inkjet printer is adjusted where needed.

Therefore, it is required to be able to easily and appropriately perform adjustment of the inkjet printer.

SUMMARY

The inventor of the present application conducted intensive studies on a method for adjusting an inkjet printer. Then, the inventor has considered reading, with a scanner, a test pattern printed by an inkjet printer and analyzing, with a computer, the test pattern by image processing. The inventor has considered that with this image processing, for example, a correction value used for control of the operation of the inkjet printer is calculated by calculation executed by a computer, and this correction value is stored in a setting value storage that stores a setting value for controlling the operation of the inkjet printer. Such configuration can appropriately perform, even after shipment of the inkjet printer or the like, for example, adjustment of the inkjet printer by causing the inkjet printer to print the test pattern in a normal printing environment or the like in which the inkjet printer is used. In this case, even if the inkjet printer does not have a function of reading the test pattern, the test pattern can be appropriately read using, for example, a commercially available scanner or the like. By calculating the correction value by the image processing in the computer and storing the correction value in the setting value storage, for example, it becomes possible to reduce the number of adjustment man-hours and to reduce an occurrence of a difference in the adjustment result due to an individual difference of the adjuster performing the adjustment. This can appropriately reduce an occurrence of a difference, for each individual inkjet printer, in the image quality in the printing result for each inkjet printer, for example. Therefore, such configuration makes it possible to easily and appropriately perform adjustment of the inkjet printer, for example.

Regarding the method for adjusting the inkjet printer performed in such manner, the inventor of the present application has found, through further intensive studies, more specifically, a method for appropriately performing correction of the position of the dot of the ink formed on a medium. In order to solve the above problems, this disclosure is a method for adjusting an inkjet printer that performs adjustment for the inkjet printer, the method including: a pattern printing stage of causing the inkjet printer to print a predetermined test pattern on a medium; a pattern reading stage of generating a pattern image that is an image indicating the test pattern by reading, with a scanner, the medium on which the test pattern is printed in the pattern printing stage; an analyzing stage of performing analysis on the pattern image by a computer; and a setting value updating stage of updating a control setting value stored in a setting value storage that stores the control setting value that is a setting value for controlling an operation of the inkjet printer, the setting value updating stage of updating at least a part of the control setting value based on a result of analysis in the analyzing stage, in which the inkjet printer includes a plurality of inkjet heads each having a nozzle row in which a plurality of nozzles are arranged with positions in a predetermined nozzle row direction misaligned from one another, and a main scan driving unit that causes the plurality of inkjet heads to perform a main scan of ejecting ink while relatively moving with respect to the medium in a main scanning direction set in advance, the main scan driving unit causes the plurality of inkjet heads to perform the main scan based on the control setting value stored in the setting value storage, and in the pattern printing stage, causing the inkjet printer to print the test pattern including a pattern for ejecting ink from a plurality of the nozzle rows with respect to a same position in the main scanning direction, the analyzing stage includes a misalignment amount detecting stage of detecting, by image processing executed by the computer based on the pattern image, a dot position misalignment amount that is, regarding a position of a dot of ink formed on the medium by ejecting ink from the nozzle included in each of the plurality of nozzle rows in the plurality of inkjet heads, a misalignment amount of a position of the dot occurring in each of the nozzle rows, and a correction value calculating stage of calculating, by calculation executed the computer, a dot position correction value that is a correction value corresponding to the dot position misalignment amount detected in the misalignment amount detecting stage, and in the setting value updating stage, by causing the setting value storage to store, as at least a part of the control setting value, the dot position correction value calculated in the correction value calculating stage, at least a part of the control setting value is updated based on a result of analysis in the analyzing stage.

In a case of this configuration, for example, by the scanner reading the test pattern and by the computer executing predetermined image processing and calculation, it is possible to easily and appropriately grasp a state of the inkjet printer. More specifically, for example, when using a plurality of inkjet heads each having a nozzle row, it is possible to appropriately detect the dot position misalignment amount corresponding to each nozzle row. In this case, for example, based on the dot position misalignment amount, it is possible to appropriately calculate the dot position correction value corresponding to the dot position misalignment amount. Then, by causing the setting value storage to store the dot position correction value, it is possible to appropriately reflect the dot position correction value in the operation of the inkjet printer, for example. In this case, by performing detection of the dot position misalignment amount and calculation of the dot position correction value by image processing and calculation in the computer based on the test pattern read by the scanner, it is possible to, for example, reduce the number of man-hours of adjustment, appropriately reduce an occurrence of a difference in a result of adjustment due to an individual difference of an adjuster performing the adjustment, and the like. Therefore, such configuration makes it possible to easily and appropriately perform adjustment of the inkjet printer, for example.

In this configuration, each of the plurality of inkjet heads may have, for example, a plurality of nozzle rows. In this case, in the pattern printing stage, for example, any one nozzle row in any one inkjet head is selected as a reference nozzle row. As a pattern for ejecting ink from the plurality of nozzle rows with respect to the same position in the main scanning direction, for example, the inkjet printer is caused to print, for each nozzle row other than the reference nozzle row, a pattern for ejecting ink from two nozzle rows including each of the reference nozzle row and a nozzle row other than the reference nozzle row to the same position in the main scanning direction. Such configuration can cause the inkjet printer to appropriately print the pattern for detecting the dot position misalignment amount, for example.

As a pattern for ejecting ink from the plurality of nozzle rows with respect to the same position in the main scanning direction, for example, it is conceivable to use a pattern of multiple lines in which a plurality of lines are drawn at the same position in design. In this case, a pattern of multiple lines can be considered as a pattern in which a plurality of lines are drawn at the same position in design in the main scanning direction by drawing a line extending in a direction orthogonal to the main scanning direction, for example, with the ink ejected from each nozzle row. In this configuration, as the inkjet head, it is conceivable to use a configuration in which the volume of ink ejected from each nozzle, for example, can be changed in a plurality of stages. In this case, in the pattern printing stage, for example, for each nozzle row other than the reference nozzle row, it is conceivable to cause the inkjet printer to draw multiple lines for each volume of ink of a plurality of stages. Such configuration can cause the inkjet printer to appropriately print the pattern for detecting the dot position misalignment amount for each volume of ink, for example.

In this case, as the multiple lines drawn for each volume of ink of the plurality of stages corresponding to each nozzle row other than the reference nozzle row, it is conceivable to draw a plurality of lines including a reference nozzle line, which is a line drawn in the reference nozzle row, for example, and an adjustment nozzle line, which is a line drawn in the nozzle row other than the reference nozzle row. In this case, in the pattern printing stage, as the multiple lines corresponding to the respective ink volumes, for example, it is conceivable to cause the inkjet printer to draw a reference nozzle line in which ink dots of a plurality of types of sizes corresponding to respective volumes of the plurality of stages of ink are lined, and an adjustment nozzle line in which only ink dots of the size corresponding to the volume of one type of ink are lined. Such configuration can cause the inkjet printer to appropriately print the pattern for detecting the dot position misalignment amount for each volume of ink, for example.

When using an inkjet head in which the volume of ink to eject can be changed in a plurality of stages, a line in which ink dots of a plurality of types of sizes are lined may be further caused to be drawn also in a nozzle row other than the reference nozzle row. In this case, in the pattern printing stage, for example, for each nozzle row other than the reference nozzle row, the inkjet printer is caused to further draw a line drawn in each nozzle row, the line in which ink dots of a plurality of types of sizes corresponding to the respective volumes of ink of the plurality of stages are lined. Such configuration makes it possible to more appropriately check an influence of the difference in dot size and the like for the ink dots formed in the same nozzle row, for example.

In this configuration, the pattern of ejecting the ink from the plurality of nozzle rows to the same position in the main scanning direction can be considered as a misalignment amount detection pattern for detecting the dot position misalignment amount at the misalignment amount detecting stage, for example. In the pattern printing stage, the inkjet printer may be caused to print a test pattern further including a pattern other than the misalignment amount detection pattern, for example. More specifically, in this configuration, the inkjet printer further includes a carriage that holds a plurality of inkjet heads, for example. In the pattern printing stage, it is conceivable to cause the inkjet printer to print a test pattern including, for example, the misalignment amount detection pattern and an attachment state detection pattern.

In this case, the attachment state detection pattern can be considered as a pattern for detecting an attachment state, which is a state in which each inkjet head is attached to the carriage, for example. As the attachment state, it is conceivable to detect at least any of, for example, a tilt of the inkjet head, a positional misalignment in a predetermined front-rear direction, and a positional misalignment in a staggered arrangement. In this case, the analyzing stage further includes, for example, a numerical value calculating stage, a determining stage, and an analysis result file generating stage. In the numerical value calculating stage, an attachment state numerical value, which is a numerical value indicating the attachment state, is calculated by image processing executed by a computer based on a part indicating the attachment state detection pattern in a pattern image, for example. In the determining stage, it is determined whether or not the attachment state numerical value falls within a reference numerical value range set in advance for the attachment state numerical value, for example. Then, in the analysis result file generating stage, an analysis result file, which is a file indicating a result of the determination in the determining stage, for example, is generated.

In a case of this configuration, by determining the suitability of the attachment state of each inkjet head, for example, it is possible to more appropriately perform the adjustment of the inkjet printer. In this case, the suitability of the attachment state of each inkjet head can be easily and appropriately determined based on an objective numerical value, for example. Therefore, such configuration can determine the suitability of an adjustment level on the numerical value basis for at least a part of the adjustment performed on the inkjet printer, for example, and can numerically manage the adjustment level. For example, this can more appropriately reduce an occurrence of a difference in the adjustment result due to an individual difference of the adjuster performing the adjustment. In the determining stage, for example, whether or not the dot position misalignment amount falls within a reference numerical value range set in advance with respect to the dot position misalignment amount may be further determined. In this case, it is conceivable to generate an analysis result file further indicating the determination result regarding the dot position misalignment amount, for example, in the analysis result file generating stage. Such configuration can more appropriately manage numerically the adjustment level also for the dot position misalignment amount, for example.

In the analysis result file generating stage, it is conceivable to generate an analysis result file indicating identification information for identifying the inkjet printer used for printing of a test pattern, for example. Such configuration can easily and appropriately manage the state of the corresponding inkjet printer using the analysis file, for example. In this case, it is also conceivable to use the analysis result file as a proof (evidence) indicating that adjustment conforming to a predetermined specification range (adjustment to a level within the specification range) is performed on the inkjet printer, for example. Use of such analysis file enables the state of each inkjet printer to be appropriately managed in a case of using a plurality of inkjet printers, for example.

As the analysis result file, it is conceivable to use a file indicating a determination result of each evaluation item, a reference numerical value of the determination, the analysis result, and the like in association with the inkjet printer for a plurality of adjustment items performed on the inkjet printer, for example. More specifically, in this case, in the analysis result file generating stage, it is conceivable to generate an analysis result file indicating a determination result with respect to the dot position misalignment amount in the determining stage, a reference numerical value range set in advance with respect to the dot position misalignment amount, and the dot position misalignment amount for each nozzle row, for example, and indicating a determination result with respect to the attachment state numerical value in the determining stage, a reference numerical value range set in advance with respect to the attachment state numerical value, and the attachment state numerical value for each inkjet head. Such configuration can easily and appropriately manage the state of the inkjet printer using the analysis file, for example.

In the pattern printing stage, it is also conceivable to cause a test pattern including a pattern other than the misalignment amount detection pattern and the attachment state detection pattern, for example, to be printed. More specifically, the inkjet printer further includes a drive signal output unit that outputs a drive signal, for example. The drive signal can be considered as a signal that causes, for example, each of the plurality of inkjet heads to eject ink. In the pattern printing stage, it is conceivable to cause the inkjet printer to print a test pattern including a voltage detection pattern, which is a pattern for detecting the voltage of the drive signal received by each of the plurality of inkjet heads, for example. In this case, in the numerical value calculating stage, a voltage-corresponding numerical value, which is a numerical value corresponding to the voltage of the drive signal received by each of the plurality of inkjet heads, is calculated by image processing executed by the computer based on the part indicating the voltage detection pattern in the pattern image, for example. In the determining stage, it is determined whether or not the voltage-corresponding numerical value falls within a reference numerical value range set in advance for the voltage-corresponding numerical value, for example. Then, in the analysis result file generating stage, an analysis result file indicating a determination result regarding the voltage-corresponding numerical value, for example, is generated. Such configuration makes it possible to appropriately check, by the numerical value, the voltage of the drive signal received by each inkjet head, for example. This can appropriately determine the suitability of the adjustment level on a numerical value basis, for example, when adjusting the voltage of the drive signal.

In the pattern printing stage, the inkjet printer may be caused to print a test pattern including a sub scanning moving amount detection pattern, which is a pattern for detecting a sub scanning moving amount, which is a moving amount by which the plurality of inkjets relatively move with respect to the medium in a sub scan, for example. The sub scan can be considered as an operation or the like of relatively moving with respect to the medium in the sub scanning direction orthogonal to the main scanning direction, for example. The inkjet printer further includes a sub scan driving unit that causes the plurality of inkjet heads to perform the sub scan, for example. In this case, in the misalignment amount detecting stage, a sub scanning misalignment amount, which is a misalignment amount of the sub scanning moving amount, is detected by image processing executed by the computer based on the part indicating the sub scanning moving amount detection pattern in the pattern image, for example. In the correction value calculating stage, a sub scanning correction value, which is a correction value corresponding to the sub scanning misalignment amount detected in the misalignment amount detecting stage, for example, is calculated by calculation executed by the computer. Then, in the setting value updating stage, the setting value storage is caused to store, as at least a part of the control setting value, the sub scanning correction value calculated in the correction value calculating stage, for example. Such configuration makes it possible to appropriately calculate the sub scanning correction value corresponding to the sub scanning misalignment amount, for example, and appropriately reflect the sub scanning correction value in the operation of the inkjet printer.

In this configuration, in the pattern reading stage, it is conceivable to use a scanner in which, for example, the readable maximum document size is equal to or less than the A4 size. Such configuration can appropriately execute the operation of the pattern reading stage using a commercially available inexpensive PC scanner or the like, for example. In this case, in the pattern printing stage, for example, the inkjet printer is caused to print the test pattern within the printing range of equal to or less than the A4 size. Such configuration can more appropriately execute the operation of the pattern reading stage, for example. In this case, in the pattern printing stage, it is conceivable to cause the inkjet printer to print a test pattern on a medium of equal to or less than the A4 size. Where necessary, the inkjet printer may be caused to print a test pattern on each medium, using a plurality of media of equal to or less than the A4 size, for example. Such configuration can cause the inkjet printer to print all necessary patterns by being divided into a plurality of media, even in a case where all necessary patterns cannot be printed with one A4 size medium, for example.

As a configuration of this disclosure, it is also conceivable to use a program or a printing system having a similar feature to those described above. Also in these cases, similar effects to those described above can be achieved.

Effect of the Disclosure

According to this disclosure, adjustment of the inkjet printer can be easily and appropriately performed.

BRIEF DESCRIPTION OF THE DRAWINGS

FIG. 1(*a*) illustrates an example of a configuration of a main part of the printing system 10. FIG. 1(*b*) illustrates an example of a configuration of a main part of a printing apparatus 12.

FIG. 2(*a*) illustrates an example of a configuration of the head unit 102. FIG. 2(*b*) illustrates an example of a configuration of an inkjet head 202 in the head unit 102.

FIG. 4(*a*) illustrates an example of a misalignment amount detection pattern 400. FIG. 4(*b*) illustrates one multiple line 402 in an enlarged manner.

FIG. 5(*a*) illustrates an example of the adjustment pattern. FIG. 5(*b*) illustrates an example of a configuration of a head-by-head pattern 508.

DESCRIPTION OF EMBODIMENTS

An embodiment according to this disclosure will be described below with reference to the drawings.

Figure 1A:
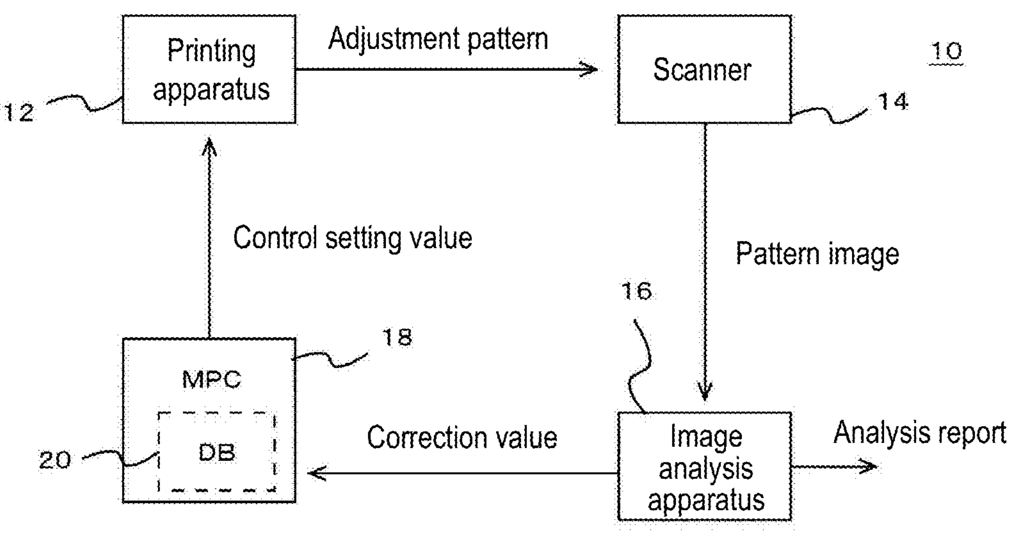
FIG. 1(*a*) and FIG. 1(*b*) are views describing a printing system 10 that executes a method for adjusting an inkjet printer according to one embodiment of this disclosure.
Figure 1B:
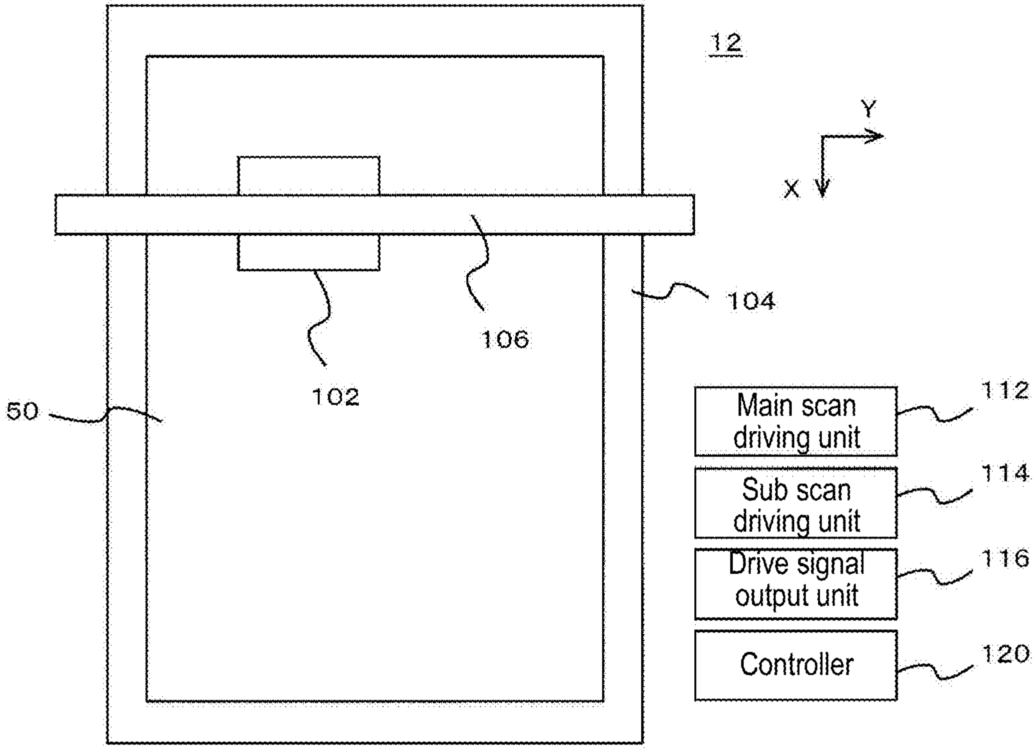

FIG. 1(*a*) and FIG. 1(*b*) are views describing the printing system 10 that executes the method for adjusting the inkjet printer according to one embodiment of this disclosure. FIG. 1(*a*) illustrates an example of the configuration of the main part of the printing system 10. Other than the points described below, the printing system 10 may have features identical or similar to known printing systems. For example, the printing system 10 may further have a configuration identical or similar to known printing systems other than the illustrated configuration.

The printing system 10 is a printing system that performs printing by an inkjet method, and includes the printing apparatus 12, a scanner 14, the image analysis apparatus 16, and an MPC 18. The printing apparatus 12 is an inkjet printer that executes printing in the printing system 10. The printing apparatus 12 includes a plurality of inkjet heads, and prints an adjustment pattern that is a preset test pattern on a medium that is a printing target at the time of adjustment of performing adjustment on the printing apparatus 12. The configuration of the printing apparatus 12 will be described in more detail later.

The scanner 14 is an image reading apparatus that reads an image printed on a medium by the printing apparatus 12. The scanner 14 reads an adjustment pattern printed on the medium at the time of adjustment with respect to the printing apparatus 12. By reading the adjustment pattern using the scanner 14, it is possible to easily and appropriately read the adjustment pattern without providing the printing apparatus 12 with a special configuration or the like for reading an image. Use of the scanner 14 also enables reading of the image at high resolution to be performed easily and appropriately. As the scanner 14, a color scanner that can read a full-color image is preferably used. As the scanner 14, it is conceivable to use a scanner that is connected to a computer, for example, and performs reading of an image under the control of the computer. As such the scanner 14, it is possible to suitably use a scanner having a maximum readable document size of equal to or less than the A4 size, for example. In this case, it is preferable to use a scanner having a reading resolution of equal to or greater than 2400 dpi (e.g., about 2400 to 4800 dpi, preferably about 2400 to 3000 dpi). This configuration can appropriately execute reading of the adjustment pattern using a commercially available inexpensive PC scanner or the like. As the computer to which the scanner 14 is connected, for example, a general-purpose PC or the like can be suitably used. In this example, the image analysis apparatus 16 is used as this computer.

The image analysis apparatus 16 is a computer that performs image analysis on a pattern image that is an image indicating an adjustment pattern, and performs image processing on a pattern image generated by reading of the adjustment pattern by the scanner 14. The image analysis apparatus 16 performs calculation of a correction value used to control of the operation of the printing apparatus 12, calculation of a numerical value indicating the state of the inkjet head in the printing apparatus 12, and the like. Specifically, the image analysis apparatus 16 is a computer such as a PC, and performs calculation of a numerical value such as a predetermined correction value based on an adjustment pattern according to an image analysis tool that is a program causing the computer to function as an image analysis apparatus. The image analysis apparatus 16 supplies a calculated correction value to the MPC 18. Furthermore, the image analysis apparatus 16 generates an analysis result file, which is a file indicating an analysis result, as an analysis report indicating a result of analysis in image processing. The numerical values calculated by the image analysis apparatus 16, the operation of the image analysis apparatus 16, and the like will be described in more detail later.

The MPC 18 is a computer (control PC) that controls the operation of the printing apparatus 12, and controls the operation of the printing apparatus 12 by operating according to a program for controlling the operation of the printing apparatus 12. Specifically, the MPC 18 manages a database 20 that stores control setting values, and controls the operation of the printing apparatus 12 based on the control setting values stored in the database 20. In this case, the control setting value can be considered as a setting value or the like for controlling the operation of the printing apparatus 12. The database 20 is an example of a setting value storage that stores control setting values, and is configured as a part of the MPC 18. In this case, the control setting values stored in the database 20 are stored in a storage apparatus (e.g., HDD or SSD) of the MPC 18. The database 20 stores a plurality of types of control setting values each associated with operations different from one another in the printing apparatus 12. In modifications of the MPC 18 and the database 20, the database 20 may be placed outside the MPC 18. The MPC 18 causes the database 20 to store, as at least a part of the control setting value, the correction value received from the image analysis apparatus 16. Using the correction value calculated by the image analysis apparatus 16, the MPC 18 controls the operation of the printing apparatus 12. Such configuration can appropriately perform adjustment of the operation of the printing apparatus 12 based on the correction value calculated based on the adjustment pattern. In this case, at least a part of the control setting values can be considered as at least any control setting value or the like stored in the database 20.

Next, the configuration of the printing apparatus 12 will be described.

FIG. 1(*b*) illustrates an example of a configuration of a main part of a printing apparatus 12. Other than the points described above and below, the printing apparatus 12 may have features identical or similar to known printing apparatuses. The printing apparatus 12 may further have a configuration identical or similar to known printing apparatuses other than the illustrated configuration. The printing apparatus 12 includes a head unit 102, a table unit 104, a Y bar unit 106, a main scan driving unit 112, a sub scan driving unit 114, a drive signal output unit 116, and a controller 120. The head unit 102 is a portion that ejects ink onto a medium 50 that is a printing target. The head unit 102 includes a plurality of inkjet heads, and ejects ink from each inkjet head to an ejection position on the medium 50 set according to the resolution of printing. In this case, each inkjet head ejects ink to at least a part of the ejection position selected according to an image to be printed among the ejection positions set according to the resolution of printing. A specific configuration of the head unit 102 will be described in more detail later.

The table unit 104 is a table-shaped member that holds the medium 50 at a position facing the head unit 102. The table unit 104 is a table that holds the medium 50 in a flatbed type printing apparatus, and as illustrated in FIG. 1(*b*), the entire medium 50 is placed on the upper surface to hold the medium 50 to face the head unit 102. The Y bar unit 106 is a member extending in a width direction of the medium 50 at a position facing the table unit 104 across the medium 50, and holds the head unit 102 at a position facing the medium 50. The width direction of the medium 50 is a direction parallel to a main scanning direction (Y direction in FIG. 1(*b*)) set in advance in the printing apparatus 12. The Y bar unit 106 includes a guide rail or the like that guides movement of the head unit 102 in the main scanning direction, and guides movement of the head unit 102 in the main scanning direction at the time of the main scan. In this case, the main scan can be considered as an operation or the like of ejecting ink while relatively moving with respect to the medium 50 in the main scanning direction.

The main scan driving unit 112 is a driving unit that causes the head unit 102 to perform the main scan. Causing the head unit 102 to perform the main scan can be considered as causing the plurality of inkjet heads in the head unit 102 to perform the main scan or the like. The main scan driving unit 112 causes the head unit 102 to perform the main scan by causing each inkjet head in the head unit 102 to eject ink while moving the head unit 102 along the Y bar unit 106. In this case, the main scan driving unit 112 supplies each inkjet head with the drive signal received from the drive signal output unit 116 under the control of the controller 120, and causes each nozzle in each inkjet head to eject ink according to the image to be printed. The drive signal can be considered as a signal or the like for causing each of the plurality of inkjet heads to eject ink. The drive signal can also be considered as a signal or the like for driving a drive element (e.g., a piezoelectric element or the like) that ejects ink from the nozzle in each inkjet head.

The sub scan driving unit 114 is a driving unit that causes the head unit 102 to perform the sub scan. Causing the head unit 102 to perform the sub scan can be considered as causing the plurality of inkjet heads in the head unit 102 to perform the sub scan or the like. The sub scan can be considered as an operation or the like of relatively moving with respect to the medium 50 in a sub scanning direction (X direction in FIG. 1(*b*)) orthogonal to the main scanning direction. The sub scan can also be considered as an operation or the like of changing a position facing the head unit 102 at the time of the main scan on the medium 50. The sub scan driving unit 114 changes the region where the ink is ejected in the next main scan in the medium 50 by causing the head unit 102 to perform the sub scan between the main scans. Such configuration can cause the head unit 102 to appropriately perform the main scan with respect to each position of the medium 50. The sub scan driving unit 114 causes the head unit 102 to perform the sub scan by moving the Y bar unit 106 together with the head unit 102 by a predetermined sub scanning moving amount under the control of the controller 120 with respect to the table unit 104 whose position is fixed. The sub scanning moving amount can be considered as a moving amount or the like in which the plurality of inkjets relatively move with respect to the medium 50 in the sub scan.

The drive signal output unit 116 is an output unit that supplies the plurality of inkjet heads in the head unit 102 with a drive signal. By supplying the drive element in each inkjet head with a drive signal via the main scan driving unit 112, the drive signal output unit 116 causes the ink to be ejected from the nozzle in each inkjet head.

The controller 120 is a portion including a CPU of the printing apparatus 12, and controls the operation of each unit of the printing apparatus 12 according to a program such as firmware of the printing apparatus 12. The controller 120 can also be considered as a configuration or the like corresponding to a control unit in the printing apparatus 12. The controller 120 controls the operation of each unit of the printing apparatus 12 based on the control setting values stored in the database 20. The controller 120 operates each unit of the printing apparatus 12 based on the control setting value. Specifically, the controller 120 controls the operation of the main scan driving unit 112 based on the control setting value stored in the database 20. The main scan driving unit 112 causes the head unit 102 to perform the main scan based on the control setting value. In this case, it is conceivable to perform adjustment of the timing of causing each inkjet head to eject ink based on the correction value stored in the database 20 as the control setting value. Such configuration can cause the head unit 102 to appropriately perform the main scan with higher accuracy. The controller 120 further perform adjustment of the sub scanning moving amount in the sub scan based on the correction value stored in the database 20 as the control setting value. Such configuration can cause the head unit 102 to appropriately perform the sub scan with higher accuracy. In this case, as the correction value for adjustment of the sub scanning moving amount, it is conceivable to use a correction value different from the correction value for adjustment of the timing of causing the inkjet head to eject the ink.

Next, the configuration of the head unit 102 in the printing apparatus 12 will be described.

Figures 2A, 2B:
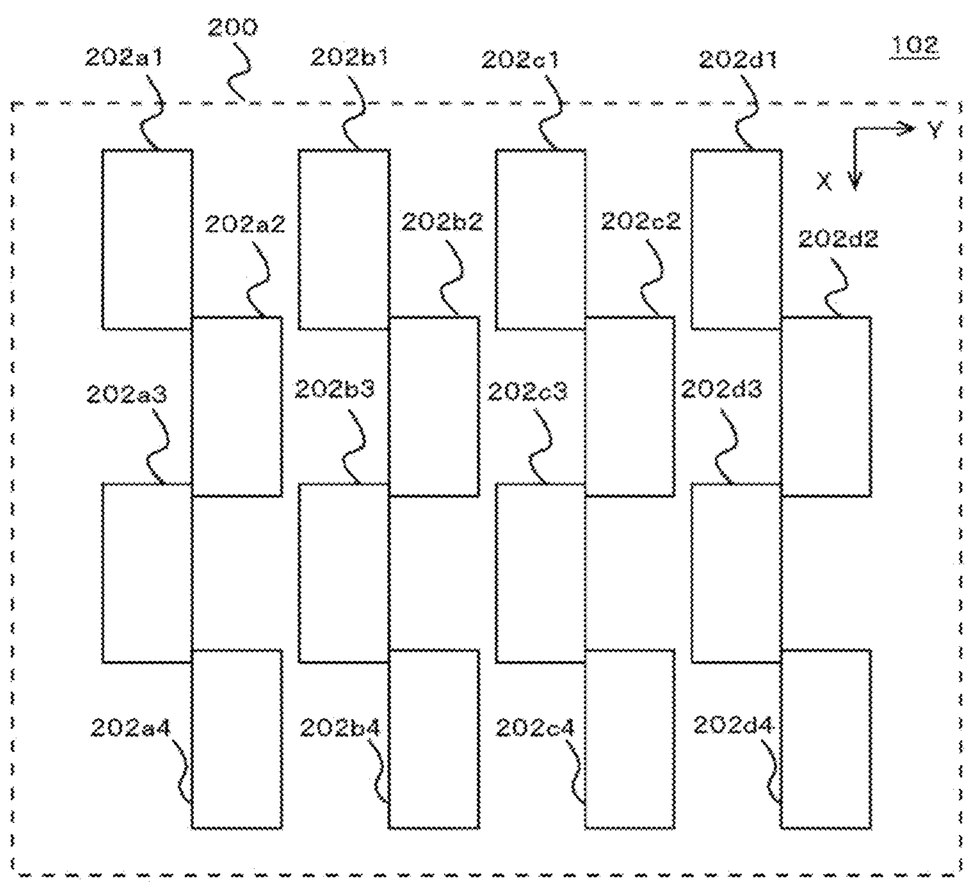
FIG. 2(*a*) and FIG. 2(*b*) are views describing a specific configuration of a head unit 102.

FIG. 2(*a*) and FIG. 2(*b*) are views describing a specific configuration of the head unit 102. FIG. 2(*a*) illustrates an example of the configuration of the head unit 102. FIG. 2(*b*) illustrates an example of the configuration of the inkjet head 202 in the head unit 102. The head unit 102 includes a carriage 200 and a plurality of the inkjet heads 202. The carriage 200 is a holding member that holds the plurality of inkjet heads 202 in the head unit 102, and holds the plurality (16) of inkjet heads 202 as distinguished and illustrated as reference signs **202*al* to 202*d*4 in FIG. 2**(*a*) at positions facing the table unit 104 (see FIG. 1(*b*)). In this case, holding the inkjet head 202 to face the table unit 104 can be considered as holding or the like the inkjet head 202 so that the ink is ejected toward the medium on the table unit 104.

The carriage 200 holds the plurality of inkjet heads 202 by a configuration in which a plurality of rows of inkjet heads 202 in which the plurality of inkjet heads 202 are arranged in the sub scanning direction in a staggered arrangement are arranged in the main scanning direction. Specifically, the four inkjet heads 202 illustrated as inkjet heads **202*al* to 202*a*4 are in a first row arranged in a staggered array. The four inkjet heads 202 illustrated as inkjet heads 202*b*1 to 202*b*4 are in a second row arranged in a staggered array. The four inkjet heads 202 illustrated as inkjet heads 202*cl* to 202*c*4 are in a third row arranged in a staggered array. The four inkjet heads 202 illustrated as inkjet heads 202*d*1 to 202*d*4 are in a fourth row arranged in a staggered array. Arranging the plurality of inkjet heads 202 in a staggered array can be considered as arranging or the like, in the sub scanning direction, the plurality of inkjet heads 202 whose positions in the main scanning direction are misaligned. In this case, the plurality of inkjet heads 202 may be arranged in the sub scanning direction so as to partially overlap in the sub scanning direction, for example. Specifically, as illustrated in FIG. 2**(*a*), the four inkjet heads 202 arranged in the staggered array are arranged in the sub scanning direction so that the positions in the main scanning direction are alternately misaligned and parts in the sub scanning direction overlap between the adjacent inkjet heads 202.

The plurality of inkjet heads 202 arranged in the staggered array can be used as one virtual large inkjet head. Specifically, it can be considered that the nozzles of the plurality of inkjet heads 202 arranged in the staggered array are put together to constitute one virtual nozzle row. As illustrated in FIG. 2(*a*), the first to fourth rows of the inkjet heads 202 are arranged in the main scanning direction with their positions in the sub scanning direction aligned. In this case, it can be considered that the virtual nozzle rows corresponding to each staggered array are arranged in the main scanning direction. In this case, it can be considered to eject the ink of the same color in the plurality of inkjet heads 202 arranged in each staggered array (one staggered array), and eject the ink of different colors in the inkjet heads 202 arranged in the staggered arrays different from each other. Specifically, in a case where the carriage 200 holds the plurality of inkjet heads 202 separately in the first to fourth rows, it is conceivable that the ink of each color of the process color is ejected by the inkjet heads 202 of each of the first to fourth rows. Each color of the process color can be considered as a basic color or the like in color expression by the subtractive color mixing method. It is conceivable to use the ink of each color of Y (yellow), M (magenta), C (cyan), and K (black) as the ink of each color of the process color. Use of the ink of each color enables color printing with high quality to be appropriately performed. Depending on the application or the like of the printing apparatus 12 (see FIG. 1(*a*)), ink of a color different from other inkjet head 202 in the same staggered array may be ejected by a part of the plurality of inkjet heads 202 arranged in one staggered array. Such configuration can eject ink of more colors in the head unit 102. It is also conceivable to eject or the like ink of the same color by the inkjet head 202 of a plurality of staggered arrays.

Regarding the configuration of the head unit 102, the number and arrangement of the inkjet heads 202 are not limited to the example illustrated in FIG. 2(*a*), and can be variously changed. The head unit 102 may further have another configuration in accordance with the ink ejected from the inkjet head 202. For example, when ejecting ultraviolet-curable ink from the inkjet head 202, the head unit 102 may further include an ultraviolet light source or the like.

As illustrated in FIG. 2(*b*), each of the inkjet heads 202 has a plurality of nozzle rows 212. The nozzle row 212 can be considered as a row or the like in which a plurality of nozzles are arranged with their positions in a predetermined nozzle row direction misaligned from one another. The nozzle row direction is a direction parallel to the sub scanning direction. In each nozzle row 212, the plurality of nozzles are arranged in the sub scanning direction at a constant nozzle interval with their positions in the main scanning direction aligned. In each inkjet head 202, the plurality of nozzle rows 212 are arranged in the main scanning direction with their positions in the sub scanning direction misaligned. In this case, it is conceivable to misalign the position in the sub scanning direction between the nozzle rows 212 by a distance less than the nozzle interval in one nozzle row 212. Such configuration can make the distance between the nozzles in the sub scanning direction in one inkjet head 202 (minimum distance between the nozzles in the sub scanning direction in the inkjet head 202) shorter than the nozzle interval in one nozzle row 212. This makes it possible to perform high resolution printing at high speed and appropriately.

FIG. 2(*b*) illustrates an example of the configuration of the inkjet head 202 in a simplified manner for a case where the number of nozzle rows 212 in one inkjet head 202 is four rows. The number of nozzle rows 212 in one inkjet head 202 may be other than four rows. Considering performing the high resolution printing at high speed and appropriately, the number of nozzle rows 212 in one inkjet head 202 is preferably equal to or greater than four rows (e.g., about 4 to 6 rows).

Next, the operation or the like of image processing executed in the image analysis apparatus 16 will be described. The image analysis apparatus 16 performs calculation of a numerical value such as a predetermined correction value based on an adjustment pattern according to the image analysis tool. In this case, a program having the configuration illustrated in FIG. 3, for example, is used as the image analysis tool.

Figure 3:
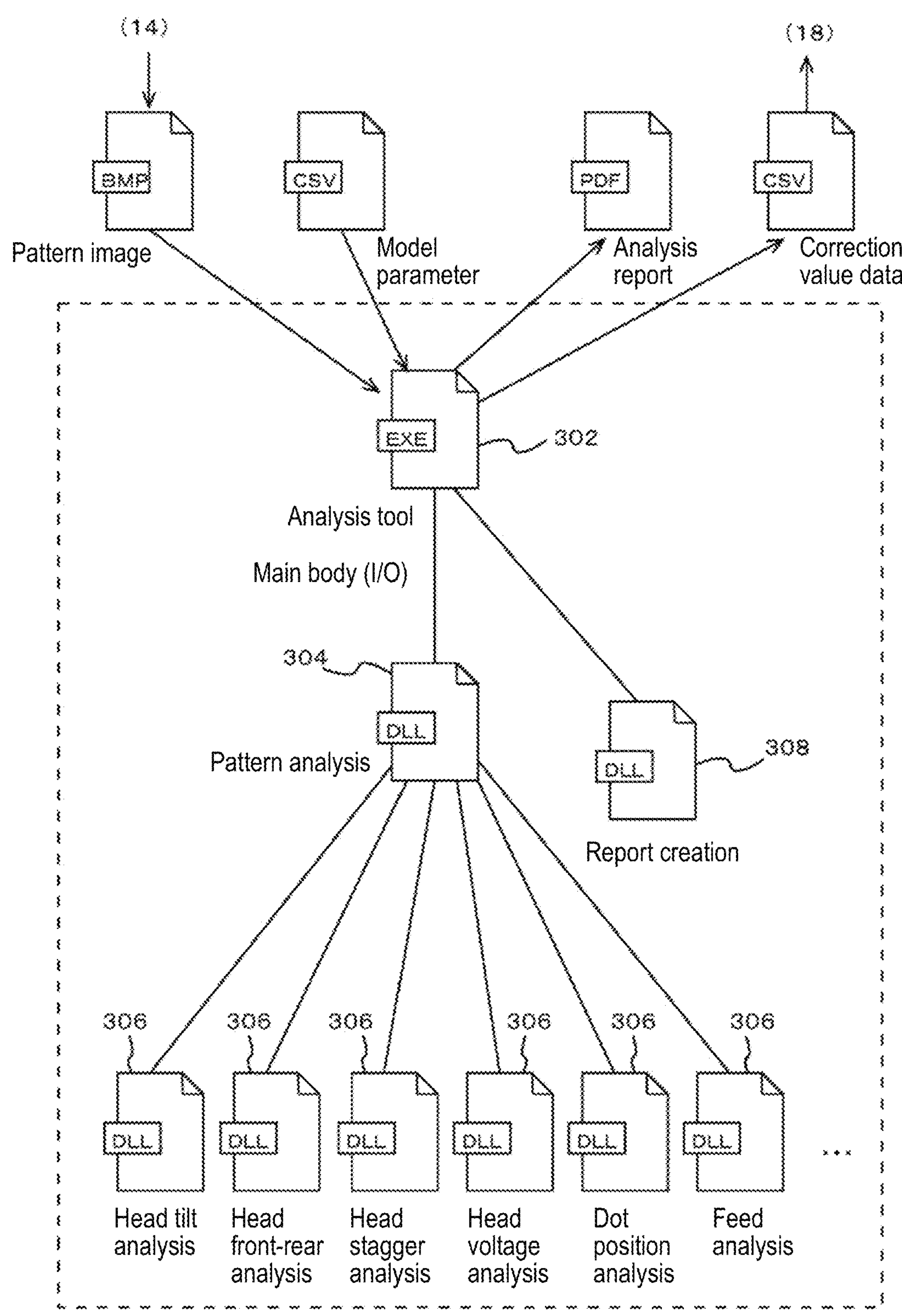
FIG. 3 is a view illustrating an example of a configuration of an image analysis tool.

FIG. 3 illustrates an example of the configuration of the image analysis tool. The image analysis tool is a program executed in the image analysis apparatus 16 (see FIG. 1(*a*)), and includes a plurality of modules. The image analysis tool includes, as a plurality of modules, an analysis tool body 302, a pattern analysis library 304, a plurality of adjustment item libraries 306, and a report creation library 308. The analysis tool body 302 is a module serving as a tool body that controls the entire image analysis tool. The analysis tool body 302 is an executable file (e.g., a file in an exe format), and performs management of input/output processing (I/O processing) of data with respect to the image analysis tool, input/output processing of data between modules in the image analysis tool, and the like.

Specifically, the analysis tool body 302 displays a user interface (UI) on a monitor of the image analysis apparatus 16, for example, and performs reading of a pattern image and a model parameter by selection of a file by the user. In this case, the pattern image is an image generated by reading, with the scanner 14 (see FIG. 1(*a*)), the adjustment pattern printed on the medium. The pattern image is stored in the storage apparatus of the image analysis apparatus 16, and is read into the image analysis tool by being selected by the user through the user interface. In this case, the pattern image read into the image analysis tool can be considered as an analysis image or the like that is an analysis target. The model parameter is a parameter set according to the model of the printing apparatus 12 (see FIG. 1(*a*)) used for printing of the adjustment pattern. Use of such model parameter can cause the image analysis tool to perform an operation according to the model of the printing apparatus 12. It becomes possible to use a common image analysis tool for a plurality of types of models of printing apparatuses. As the model parameter, for example, it is conceivable to use a parameter indicating the arrangement of the inkjet heads, the configuration of the inkjet head, or the like in the head unit 102 (see FIG. 2(*a*)). As the parameter indicating the arrangement of the inkjet heads, for example, it is conceivable to use a parameter indicating the number of inkjet heads or the number of arrangements in the staggered arrangement.

The image analysis apparatus 16 outputs correction value data and an analysis report as an output in the operation executed according to the image analysis tool. In this case, the image analysis apparatus 16 outputs, as correction value data, a file indicating the correction value calculated by the image analysis apparatus 16. As an analysis report, an analysis result file indicating an analysis result is output. In this case, the image analysis apparatus 16 performs calculation of the correction value, generation of the analysis result file, and the like by the operation executed according to the image analysis tool. The correction value data can also be considered as a file or the like for feeding back the correction value to the printing apparatus 12. Specifically, the image analysis apparatus 16 outputs the correction value data by generating a file indicating the correction value in a predetermined format. In this case, a program (e.g., an adjustment tool) for managing information stored in the database 20 is executed by the image analysis apparatus 16 or another computer, thereby causing the database 20 to store the correction value. The correction value may be directly stored in the database 20 in the operation of the image analysis apparatus 16 executed according to the image analysis tool. As the analysis result file, it is conceivable to use a file, for example, in a pdf format or a table calculation file format. The analysis report output by the analysis result file can be considered as a report or the like in which the adjustment level in the printing apparatus 12, for example, is quantified and organized in a format that is easy for a person to see. It is conceivable to use the analysis report for evidence management of the adjustment level, for example.

Each of the pattern analysis library 304, the plurality of adjustment item libraries 306, and the report creation library 308 is a module that functions as a library. As a module of these libraries, a file in a dynamic link library format (DLL format) is used. Among these libraries, the pattern analysis library 304 is a library for interpreting a pattern image, and calls a necessary module from the plurality of adjustment item libraries 306 based on a result of interpreting the pattern image. The pattern analysis library 304 causes the plurality of adjustment item libraries 306 to perform various analyses on the pattern image. Each of the plurality of adjustment item libraries 306 is a library that performs analysis for various items (adjustment items) that is analysis targets by the image analysis tool. Each of the plurality of adjustment item libraries 306 is a library for items different from one another, and is called from the pattern analysis library 304 as necessary to execute processing related to the corresponding item. The image analysis tool of this example is configured to be able to add a necessary adjustment item library 306 in a case where the number of items to be analyzed increases later.

Specifically, as the plurality of adjustment item libraries 306, as illustrated in FIG. 3, libraries for head tilt analysis, for head front-rear analysis, for head stagger analysis, for head voltage analysis, for dot position analysis, and for feed analysis are used. In this case, the adjustment item library 306 for head tilt analysis performs analysis of the attachment angle of the inkjet head 202 (see FIG. 2(*b*)) with respect to the carriage 200 (see FIG. 2(*a*)). The attachment angle of the inkjet head 202 can be considered as an angle or the like at which the long direction of the inkjet head 202 is misaligned with respect to a predetermined correct orientation. The adjustment item library 306 for head front-rear analysis performs analysis of the position in the sub scanning direction, which becomes the front-rear direction, for each inkjet head 202 held in the carriage 200. The adjustment item library 306 for head stagger analysis performs analysis of the positional relationship in the front-rear direction between the adjacent inkjet heads 202 for the plurality of inkjet heads 202 arranged in a staggered array. The adjustment item library 306 for head voltage analysis performs analysis of the voltage of the drive signal supplied to each inkjet head 202. The adjustment item library 306 for dot position analysis performs analysis of the position of the ink dot formed by the ink ejected from the nozzle in the nozzle row of each inkjet head 202. The adjustment item library 306 for feed analysis performs analysis of the sub scanning moving amount in the sub scan.

The report creation library 308 generates an analysis result file based on the results of the analyses performed in the plurality of adjustment item libraries 306. In this case, the report creation library 308 receives the analysis result in each adjustment item library 306 via the analysis tool body 302 and the pattern analysis library 304. The report creation library 308 outputs an analysis result file via the analysis tool body 302. By outputting the correction value data, the image analysis apparatus 16 causes the database 20 to store the correction value. In this case, the correction value is calculated in accordance with the result of the analysis to be executed in at least a part of the plurality of adjustment item libraries 306. The analysis tool body 302 receives the correction value from the adjustment item library 306 via the pattern analysis library 304, and outputs correction value data indicating the received correction value.

Among various analyses executed by the plurality of adjustment item libraries 306, the head tilt analysis, the head front-rear analysis, and the head stagger analysis can be considered as analyses related to mechanical adjustment. On the other hand, the head voltage analysis, the dot position analysis, and the feed analysis can be considered as analyses related to adjustment of printing operation (print adjustment) other than mechanical adjustment. Then, the correction value is calculated in the adjustment item library 306 for dot position analysis and the adjustment item library 306 for feed analysis among the adjustment item library 306 related to print adjustment. In this case, the result of the analysis in the adjustment item library 306 not for calculating the correction value is reflected in the analysis result file. The analysis result in all the adjustment item libraries 306 including the analysis result in the adjustment item library 306 for calculating the correction value is reflected in the analysis result file.

Figure 4A:
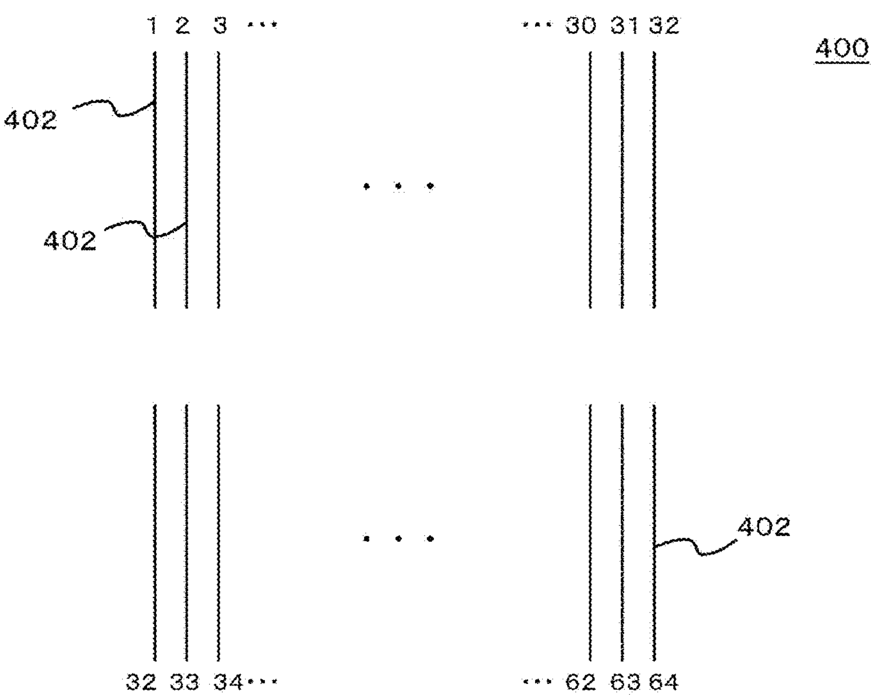
FIG. 4(*a*) and FIG. 4(*b*) are views describing an example of analysis executed in an adjustment item library 306.
Figure 4B:
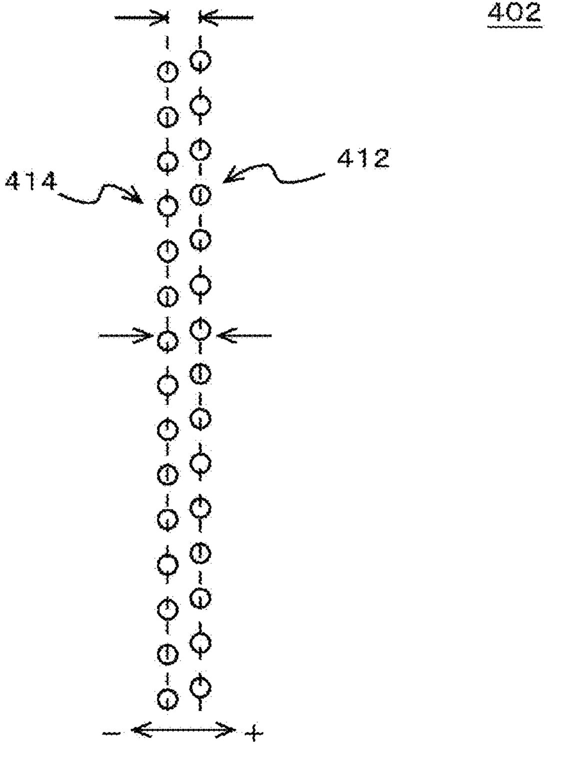

Next, an example of analysis executed in the adjustment item library 306 will be described. FIG. 4(*a*) and FIG. 4(*b*) are views describing an example of the analysis executed in the adjustment item library 306, and illustrates an example of the analysis performed in the adjustment item library 306 for dot position analysis among the plurality of adjustment item libraries 306 in the image analysis tool.

When image analysis is performed by the image analysis apparatus 16 (see FIG. 1(*a*)), the printing apparatus 12 (see FIG. 1(*a*)) is caused to print an adjustment pattern in accordance with the content of the analysis to be executed. Therefore, when the image analysis is performed in the adjustment item library 306 for dot position analysis, the printing apparatus 12 is caused to print the adjustment pattern including the misalignment amount detection pattern 400. In this case, the misalignment amount detection pattern 400 can be considered as a pattern or the like for detecting the dot position misalignment amount. The dot position misalignment amount can be considered as a misalignment amount or the like of the position of the dot occurring in each of the plurality of nozzle rows in the head unit 102 (see FIG. 2(*a*)) of the printing apparatus 12. The position of the dot can be considered as the position or the like of the dot of the ink formed on the medium by ejecting ink from the nozzle included in each of the plurality of nozzle rows in the head unit 102. The plurality of nozzle rows in the head unit 102 can be considered as a plurality of nozzle rows or the like included in the plurality of inkjet heads 202 (see FIG. 2) held by the carriage 200 (see FIG. 2(*a*)) in the head unit 102. Specifically, the plurality of nozzle rows can be considered as 64 nozzle rows or the like included in the 16 inkjet heads 202. The position of the dot can be considered as the position or the like of the dot of the ink formed on the medium by ejecting ink from the nozzle included in each of the plurality of nozzle rows in the plurality of inkjet heads 202.

As the misalignment amount detection pattern 400, a pattern illustrated in FIG. 4(*a*) is used. FIG. 4(*a*) illustrates an example of the misalignment amount detection pattern 400. The misalignment amount detection pattern 400 is a pattern for ejecting ink from a plurality of nozzle rows to the same position in the main scanning direction. Specifically, at the time of printing of the adjustment pattern, any one nozzle row in any one inkjet head 202 among the plurality of inkjet heads 202 in the printing apparatus 12 is selected as a reference nozzle row. Then, as a pattern for ejecting ink from the plurality of nozzle rows to the same position in the main scanning direction, each nozzle row other than the reference nozzle row is sequentially selected, and the printing apparatus 12 is caused to print a pattern for ejecting ink from two nozzle rows including the reference nozzle row and each nozzle row other than the reference nozzle row to the same position in the main scanning direction. As illustrated in FIG. 4(*a*), this causes the printing apparatus 12 to print the misalignment amount detection pattern 400 including the multiple line 402 of the number corresponding to the number of the nozzle rows included in the printing apparatus 12.

The multiple line 402 can be considered as a plurality of lines or the like drawn at the same position. The multiple line 402 can be considered as double lines or the like drawn by ejecting ink from two nozzle rows to the same position in the main scanning direction. In this case, ejecting the ink to the same position can be considered as ejecting the ink to the same position in design or the like. Therefore, in the multiple line 402 actually drawn, the positions of the ink dots formed by the ink ejected from the different nozzle rows may be misaligned in the main scanning direction. Such pattern of the multiple line including the multiple line 402 can also be considered as a pattern or the like in which a plurality of lines are drawn at the same position in design in the main scanning direction by drawing a line extending in the sub scanning direction with ink ejected from each nozzle row.

In this example, 64 multiple lines 402 are drawn as distinguished by adding numerals 1 to 64 in FIG. 4(*a*) corresponding to the 64 nozzle rows included in the plurality of inkjet heads 202 in the printing apparatus 12. Each of the multiple line 402 can be considered as a line or the like drawn by the reference nozzle row and a nozzle row other than that. However, in the case of drawing the multiple line 402 by the number equal to the number of the nozzle rows in the printing apparatus 12, any one of the multiple line 402 corresponds to the reference nozzle row. In this case, the multiple line 402 corresponding to the reference nozzle row can be exceptionally considered as a line or the like drawn only with the reference nozzle row. For example, when the nozzle row corresponding to the number 1 in FIG. 4(*a*) is used as the reference nozzle row, the multiple line 402 denoted by the numeral 1 is a line drawn only with the reference nozzle row. The line denoted by each of the numerals 2 to 64 becomes a line drawn using the reference nozzle row and any nozzle row other than that.

In the case of drawing such the multiple line 402, if misalignment of the position of the dot has not occurred between the two nozzle rows drawing the one multiple line 402, the lines drawn by those nozzle rows overlap at the same position in the main scanning direction. In this case, misalignment of the position of the dot not having occurred between the two nozzle rows can be considered as misalignment of the relative position of the dot based on the position of the dot formed in the reference nozzle row not having occurred. Specifically, misalignment of the position of the dot not having occurred between the two nozzle rows drawing the one multiple line 402 can be considered as misalignment of the position of the dot formed in the other nozzle row not having occurred with respect to the position of the dot formed in the reference nozzle row in the main scanning direction. In this case, misalignment of the position of the dot not having occurred can also be considered as the misalignment amount of the position of the dot being falling within a predetermined allowable range or the like. On the other hand, when misalignment of the position of the dot having occurred between the two nozzle rows drawing the one multiple line 402, the position of the line drawn by each nozzle row is misaligned in the main scanning direction as illustrated in FIG. 4(*b*) when the multiple line 402 is enlarged and observed.

FIG. 4(*b*) is an enlarged view of the one multiple line 402. The printing apparatus 12 draws each multiple line 402 by using the reference nozzle row and a nozzle row other than that. Therefore, each multiple line 402 can be considered to be configured by a reference nozzle line 412 and an adjustment nozzle line 414 as illustrated in FIG. 4(*b*). In this case, the reference nozzle line 412 is a line drawn by the reference nozzle row. The adjustment nozzle line 414 is a line drawn by a nozzle row other than the reference nozzle row. Each of the reference nozzle line 412 and the adjustment nozzle line 414 can be considered as lines or the like drawn by an arrangement of ink dots formed by the ink ejected to the same position in the main scanning direction by a plurality of nozzles included in one nozzle row. In this case, ejecting the ink to the same position in the main scanning direction by the plurality of nozzles included in one nozzle row can be considered as ejecting the ink at the same timing during the main scan or the like.

In the image analysis tool of this example, the adjustment item library 306 for dot position analysis measures the distance in the main scanning direction between the reference nozzle line 412 and the adjustment nozzle line 414 by image processing on each multiple line 402 included in the misalignment amount detection pattern 400 based on the pattern image obtained from the misalignment amount detection pattern 400. In this case, the pattern image obtained from the misalignment amount detection pattern 400 can be considered as a pattern image or the like generated by reading, with the scanner 14 (see FIG. 1(*a*)), the adjustment pattern including the misalignment amount detection pattern 400. Regarding the distance in the main scanning direction between the reference nozzle line 412 and the adjustment nozzle line 414, as the measurement distance illustrated in FIG. 4(*b*), a distance corresponding to the relative position of the adjustment nozzle line 414 with respect to the reference nozzle line 412 is calculated by image processing with a predetermined orientation as a positive direction and the opposite side as a negative direction.

In this case, this measurement distance can be considered to correspond to the misalignment amount of the dot position between two nozzle rows drawing the one multiple line 402. In this case, the dot position misalignment amount can be calculated based on one reference nozzle row for each nozzle row based on the measurement distance with respect to the multiple line 402 corresponding to each nozzle row other than the reference nozzle row. Specifically, the adjustment item library 306 for dot position analysis calculates the dot position misalignment amount based on one reference nozzle row for each nozzle row in the printing apparatus 12 based on the pattern image. A dot position correction value, which is a correction value corresponding to the dot position misalignment amount, is further calculated based on the calculated dot position misalignment amount. The dot position correction value is an example of a correction value indicated by correction value data. Such configuration can appropriately perform analysis of the position of the ink dot formed by the ink ejected from the nozzle in the nozzle row of each inkjet head 202 in the adjustment item library 306 for dot position analysis.

Here, each of the reference nozzle line 412 and the adjustment nozzle line 414 may be a line formed by some nozzles in one nozzle row. Specifically, the reference nozzle line 412 is considered to be drawn by selecting some of the plurality of nozzles in the reference nozzle row as reference nozzles and ejecting ink from the reference nozzles. It is conceivable that the adjustment nozzle line 414 is drawn by selecting some of the plurality of nozzles in a nozzle row (nozzle row that is an adjustment target) other than the reference nozzle row as an adjustment nozzle and ejecting ink from the adjustment nozzle. In a case of this configuration, the ink dots configuring each of the reference nozzle line 412 and the adjustment nozzle line 414 can be formed at a distance in the sub scanning direction. This can more appropriately identify with high accuracy the position of each ink dot. By identifying with high accuracy the positions of the ink dots configuring the reference nozzle line 412 and the adjustment nozzle line 414, it becomes possible to determine with higher accuracy and the like the positions in the main scanning direction of the reference nozzle line 412 and the adjustment nozzle line 414.

The printing apparatus 12 is considered to cause the plurality of inkjet heads 202 to perform reciprocating main scan. Causing the inkjet head 202 to perform the reciprocating main scan can be considered as causing the inkjet head 202 to perform an outward main scan of moving the inkjet head 202 in one orientation in the main scanning direction and a return main scan of moving the inkjet head 202 in the other orientation in the main scanning direction. In this case, the dot position misalignment amount is considered to be different between the outward main scan and the return main scanning, for example. Therefore, the dot position misalignment amount is preferably calculated individually for each orientation of movement of the inkjet head 202 in the outward and return main scans. In this case, it is considered to cause the printing apparatus 12 to print the misalignment amount detection pattern 400 for each orientation of movement of the inkjet head 202.

The misalignment amount detection pattern 400 includes the multiple lines 402 by the number corresponding to the number of nozzle rows in the printing apparatus 12. However, the number of nozzle rows in the printing apparatus 12 is considered to vary depending on the model, specification, and the like of the printing apparatus 12. Therefore, as the misalignment amount detection pattern 400, it is conceivable to use a pattern dynamically determined in accordance with the configuration of the printing apparatus 12. In this case, the image analysis tool performs analysis on the misalignment amount detection pattern 400 in accordance with the configuration of the printing apparatus 12 based on the model parameter. This configuration can use a common image analysis tool for the printing apparatuses 12 having various configurations. The image analysis tool of this example can also be considered to be particularly suitably usable when the number of target nozzle rows is large. In this case, the total number of nozzle rows that is an analysis target can be considered to be, for example, 20 or more, preferably 30 or more. The total number of nozzle rows that is an analysis target can be considered as the number of nozzle rows corresponding to a plurality of multiple lines 402 included in the misalignment amount detection pattern 400, the number of nozzle rows included in the printing apparatus 12, and the like. As the inkjet head 202, it is also conceivable to use a configuration in which the volume of ink ejected from each nozzle can be changed in a plurality of stages. In this case, it is also conceivable that a difference occurs depending on the volume of the ink regarding the dot position misalignment amount. In this case, the printing apparatus 12 may be caused to draw the misalignment amount detection pattern 400 including the individual multiple lines 402 for each volume of ink. In this case, it is conceivable that the image analysis apparatus 16 calculates the dot position misalignment amount and the dot position correction value for each volume of ink.

The image analysis tool further includes the adjustment item library 306 for analysis other than dot position analysis. In this case, in order to perform analysis in the adjustment item library 306 for analysis other than dot position analysis, it is conceivable to cause the printing apparatus 12 to print a pattern including a pattern other than the misalignment amount detection pattern 400 as the adjustment pattern. Also in this case, it is conceivable to use a pattern dynamically determined in accordance with the configuration or the like of the printing apparatus 12. When causing the printing apparatus 12 to print an adjustment pattern including patterns corresponding to a plurality of types of adjustment item libraries 306, it is conceivable to cause a pattern divided for each inkjet head 202, for example, to be printed on a medium. Such configuration can easily and appropriately grasp the correspondence relationship between the pattern printed on the medium and the inkjet head 202. In this case, also for each multiple line 402 configuring the misalignment amount detection pattern 400, it is considered to draw or the like with, in the pattern for each inkjet head 202, the multiple line 402 corresponding to the nozzle row in each inkjet head 202 differently from the arrangement illustrated in FIG. 4(*a*). In this case, for example, it is conceivable to use the adjustment pattern illustrated in FIG. 5(*a*) and FIG. 5(*b*) as the pattern divided for each inkjet head 202.

Figure 5A:
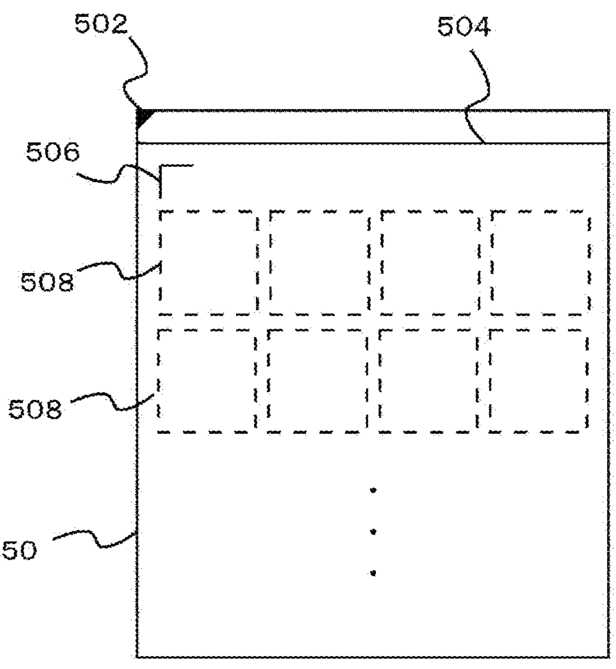
FIG. 5(*a*) and FIG. 5(*b*) are views describing an adjustment pattern constituted with patterns divided for each inkjet head 202.
Figure 5B:
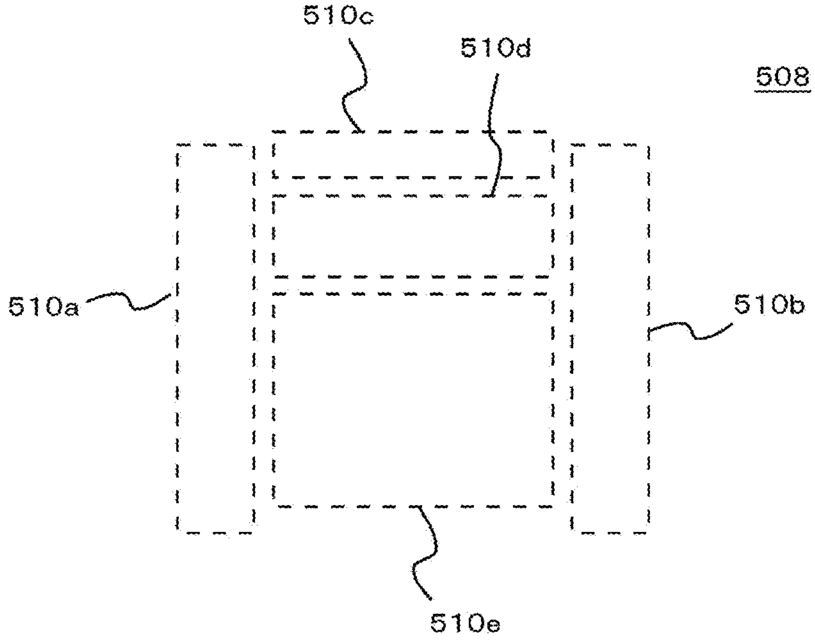

FIG. 5(*a*) and FIG. 5(*b*) are views describing an adjustment pattern configured with a pattern divided for each inkjet head 202. FIG. 5(*a*) illustrates an example of the adjustment pattern. When the image analysis tool performs analysis using the plurality of types of adjustment item libraries 306 (see FIG. 3), it is conceivable to print an adjustment pattern having a configuration illustrated in FIG. 5(*a*) on the medium 50. In this case, the adjustment pattern includes a scanner set mark 502, a tilt correction line 504, a register mark 506, and a plurality of the head-by-head patterns 508. Among these, the scanner set mark 502, the tilt correction line 504, and the register mark 506 are configurations for correcting the position, tilt, and the like of the pattern image generated by reading the adjustment pattern by the scanner 14 (see FIG. 1(*a*)). Specifically, the scanner set mark 502 is a mark used as a reference of a position when an image is read by the scanner 14. The scanner set mark 502 can also be considered as a mark or the like that becomes an origin (scan image origin) of an image scanned by the scanner 14. The tilt correction line 504 is a line used for performing correction of the tilt with respect to the pattern image generated by reading the adjustment pattern by the scanner 14. The register mark 506 is a mark used as a reference of a position with respect to the plurality of head-by-head patterns 508. The register mark 506 can also be considered as a mark or the like for defining position information of the plurality of head-by-head patterns 508.

In the adjustment pattern, the plurality of head-by-head patterns 508 are parts corresponding to the pattern divided for each inkjet head 202. In this case, the head-by-head patterns 508 are printed on the medium 50 corresponding to the respective inkjet heads 202 in the printing apparatus 12. As illustrated in FIG. 5(*b*), a plurality of patterns 510 are printed as the respective head-by-head patterns 508. FIG. 5(*b*) is a view illustrating an example of the configuration of the head-by-head pattern 508, and illustrates an example of the configuration of the head-by-head pattern 508 when printing the head-by-head pattern 508 including the plurality of patterns 510 distinguished and illustrated as patterns 510*a* to 510*e* for one inkjet head 202. As each of the patterns 510*a* to 510*e*, it is conceivable to use a pattern in accordance with an item to be analyzed in each adjustment item library 306. In this case, it is also conceivable to use a plurality of patterns among the patterns 510*a* to 510*e* for one adjustment item library 306.

When calculating the dot position misalignment amount by the adjustment item library 306 for dot position analysis, it is preferable to individually calculate the dot position misalignment amount for each orientation of movement of the inkjet head 202 in the outward and return main scans. Therefore, in this case, it is conceivable to use any one of the patterns 510*a* to 510*e* for calculation of the dot position misalignment amount in the return path, and use the any other one of the patterns for calculation of the dot position misalignment amount in the outward path. Specifically, when using the head-by-head pattern 508 having the configuration illustrated in FIG. 5(*b*), it is conceivable to print a pattern used for analysis in the adjustment item library 306 for dot position analysis as the patterns 510*a* and 510*b*. In this case, it is conceivable that the pattern 510*a* is used for calculation of the dot position misalignment amount in the return path and the pattern 510*b* is used for calculation of the dot position misalignment amount in the outward path. In this case, as the patterns 510*a* and 510*b*, it is conceivable to print a pattern including the multiple line 402 for the nozzle row of the inkjet head 202 corresponding to the head-by-head pattern unit 508 in the misalignment amount detection pattern 400 (see FIG. 4(*a*)), for example.

In this case, it is conceivable to use the patterns 510*c* to 510*e* other than the patterns 510*a* and 510*b* for analysis in the adjustment item libraries 306 other than for dot position analysis. In this case, it is conceivable to use each of the patterns 510*c* to 510*e* for analysis in any of the adjustment item library 306 for head tilt analysis, for head front-rear analysis, for head stagger analysis, for head voltage analysis, and for feed analysis. Specifically, when using the head-by-head pattern 508 having the configuration illustrated in FIG. 5(*b*), as the pattern 510*c*, it is conceivable to print a pattern used for analysis in the adjustment item library 306 for head stagger analysis, for example. As the pattern 510*d*, for example, it is conceivable to print a pattern used for analysis in the adjustment item library 306 for head tilt analysis. As the pattern 510*e*, for example, it is conceivable to print a pattern used for analysis in the adjustment item library 306 for head front-rear analysis. In this case, as any of the patterns 510*c* to 510*e*, it is also conceivable to print a pattern used for analysis in the adjustment item library 306 for head voltage analysis. In addition to the patterns 510*a* to 510*e*, it is also conceivable to print the head-by-head pattern 508 further including a pattern used for analysis in the adjustment item library 306 for head voltage analysis.

In this case, as a pattern used for analysis in the adjustment item library 306 for head tilt analysis, it is conceivable to print a pattern in which lines overlap on one end side and the other end side (back side and front side) of the inkjet head 202 in the sub scanning direction by two main scans having the sub scan in between, for example. Specifically, in the first main scan, a line parallel to the sub scanning direction is drawn by simultaneously ejecting ink with at least some nozzles (e.g., the nozzle on the back side) of any nozzle row of each inkjet head 202. The line parallel to the sub scanning direction can be considered as a line or the like drawn on the medium 50 by simultaneously ejecting the ink from the plurality of nozzles in the nozzle row at a predetermined timing at the time of the main scan. The line parallel to the sub scanning direction can also be considered as a line or the like that becomes parallel to the sub scanning direction when the inkjet head 202 is not tilted. Then, in the second main scan performed having the sub scan in between, by simultaneously ejecting the ink with at least some of the nozzles (e.g., the nozzle on the front side) in the same nozzle row as used in the first main scan, a line is further drawn at a position overlapping the line drawn in the first main scan. In this case, unless the inkjet head 202 drawing the two lines is tilted, the two lines correctly overlap. However, if the inkjet head 202 is tilted, the misalignment of the position between the two lines increases according to the magnitude of the tilt. Thus, by measuring the distance between the two lines, it becomes possible to detect the tilt of the inkjet head 202. In the adjustment item library 306 for head tilt analysis, the distance between such two lines is measured by image processing, and the magnitude of the tilt of the inkjet head 202 is calculated based on the measurement result. The magnitude of the tilt of one inkjet head 202 is preferably calculated based on the result of performing the measurement at a plurality of positions different from one another (e.g., about four positions).

As a pattern used for analysis in the adjustment item library 306 for head front-rear analysis, it is conceivable to print a pattern drawing a line extending in the main scanning direction by the same nozzle in the plurality of inkjet heads 202 arranged side by side in the main scanning direction, for example. In this case, the plurality of inkjet heads 202 arranged side by side in the main scanning direction can be considered as the inkjet heads 202 arranged in line or the like. The same nozzle in the plurality of inkjet heads 202 can be considered as a nozzle or the like in which the position in the sub scanning direction is the same position. In this case, if the positions (positions in the front-rear direction) in the sub scanning direction of the inkjet heads 202 drawing the two lines are aligned, the lines drawn by the same nozzle in the respective inkjet heads 202 correctly overlap. However, when the position in the front-rear direction of the inkjet head 202 is misaligned, the misalignment of the position in the sub scanning direction becomes large between the lines drawn by the respective inkjet heads 202 according to the magnitude of the misalignment. Therefore, by measuring the distance between the lines drawn by the nozzles of the respective inkjet heads 202, it becomes possible to detect the misalignment amount of the position in the front-rear direction of the inkjet heads 202. In the adjustment item library 306 for head front-rear analysis, the distance between such lines is measured by image processing, and the misalignment amount of the position in the front-rear direction of the inkjet head 202 is calculated based on the measurement result. In this case, it is conceivable to calculate the misalignment amount of the position of another inkjet head 202 based on one of the inkjet heads 202. It is conceivable to calculate the misalignment amount of the position of each inkjet head 202 by a mean value of the misalignment amounts obtained from a plurality of lines (e.g., about 12 lines). In this case, it is conceivable to draw a plurality of lines with a plurality of nozzles different from one another in each inkjet head 202, calculate the misalignment amount of the position of the inkjet head 202 with respect to each line, and further calculate the mean value thereof.

As a pattern used for analysis in the adjustment item library 306 for head stagger analysis, it is conceivable to print a pattern using nozzles of an overlapping part in the two inkjet heads 202 arranged adjacent to each other in the sub scanning direction in the staggered arrangement, for example. In this case, the overlapping part can be considered as a part where the ink can be ejected by the both inkjet heads 202 in the range in the sub scanning direction where the ink can be ejected by two adjacent inkjet heads 202 in the sub scanning direction. In this case, it is conceivable to draw a line extending in the main scanning direction with the nozzle at the overlapping part in each inkjet head 202. Specifically, with one of the two inkjet heads 202 as the reference inkjet head 202, the nozzle at the overlapping part in the reference inkjet head 202 is caused to draw a first line having a predetermined length extending in the main scanning direction. The nozzle at the overlapping part in the inkjet head 202 other than the reference inkjet head 202 is caused to draw a second line extending in the main scanning direction with a length different from that of the first line. In this case, as the first line, it is conceivable to draw a long line having a predetermined length. It is conceivable to draw, as the second line, a short line shorter than the first line. The long line can be considered as a line or the like having a predetermined length relatively longer than the short line. The short line can be considered as a line or the like having a predetermined length relatively shorter than the long line.

In this case, if the positional relationship in the sub scanning direction of the two inkjet heads 202 is the correct positional relationship in the staggered arrangement, the distance (distance in the sub scanning direction) between the lines (e.g., the long line and the short line) drawn by the respective inkjet heads 202 becomes a predetermined distance. However, when misalignment occurs in the positional relationship of the two inkjet heads 202 in the sub scanning direction, the misalignment of the distance between the lines drawn by the respective inkjet heads 202 increases according to the magnitude of the misalignment. Therefore, by measuring the distance between the lines drawn by the respective inkjet heads 202, it is possible to detect the misalignment amount from the correct positional relationship in the staggered arrangement. The adjustment item library 306 for head stagger analysis measures the distance between such lines by image processing, and calculates, based on the measurement result, the misalignment amount from the correct positional relationship in the staggered arrangement. In this case, it is conceivable to calculate the misalignment amount of the position of another inkjet head 202 based on one of the inkjet heads 202. It is conceivable to calculate the misalignment amount of the position of each inkjet head 202 by a mean value of the misalignment amounts obtained from a plurality of lines (e.g., about eight lines). In this case, it is conceivable to draw a plurality of lines with a plurality of nozzles in the overlapping part in each inkjet head 202, calculate the misalignment amount of the position of the inkjet head 202 with respect to each line, and further calculate the mean value thereof. In this case, due to a plurality of lines being drawn in a narrow range, the density of the lines increases, and identifying individual lines is considered to become difficult. In such case, the misalignment amount of the averaged position may be calculated by regarding the part where the plurality of lines are drawn as a rectangular pattern and obtaining the distance in the sub scanning direction between the rectangular patterns.

As a pattern used for analysis in the adjustment item library 306 for head voltage analysis, it is conceivable to print a pattern with which the color density of the region to be printed by each inkjet head 202 can be confirmed, for example. In this case, if the voltage of the drive signal supplied to the inkjet head 202 is appropriate, the color density of the region to be printed by the inkjet head 202 becomes a predetermined density set in advance. However, if the voltage of the drive signal is inappropriate, misalignment occurs in the size of the ink dot formed by the ink ejected from the inkjet head 202 according to the misalignment of the voltage. In this case, it is considered that the ink is not appropriately ejected, and the ink becomes mist. Therefore, if the voltage of the drive signal is inappropriate, misalignment from the predetermined density occurs in the color density of the region to be printed by the inkjet head 202. In the adjustment item library 306 for head voltage analysis, the color density of the region to be printed by each inkjet head 202 is measured by image processing, and based on the measurement result, it is determined whether or not the voltage of the drive signal supplied to the inkjet head 202 that has formed the dot is appropriate. A numerical value indicating the misalignment amount of the voltage of the drive signal is calculated as necessary.

As a pattern used for analysis in the adjustment item library 306 for feed analysis, it is conceivable to print a pattern with which the sub scanning moving amount in the sub scan can be confirmed. As such pattern, it is conceivable to perform two main scans performed with the sub scan in between and draw a pattern in which ends of regions (bands) where ink can be ejected are connected in each main scan. In this case, if the sub scanning moving amount is appropriate, it is possible to appropriately perform printing in a state where the end of the band is inconspicuous. On the other hand, if the sub scanning moving amount is inappropriate, a black streak or a white streak extending in the main scanning direction occurs at the position of the end of the band. In this case, the black streak can be considered as a streak-like part where printing is performed in a darker state than the surroundings by performing double printing, for example. The white streak can be considered as a streak-like part where the color of the medium 50 stands out due to the ink not being ejected, for example. In the adjustment item library 306 for feed analysis, the presence or absence of a black streak or a white streak and the width (width in the sub scanning direction) thereof are measured by image processing, thereby calculating the misalignment amount of the sub scanning moving amount. In this case, the operation of calculating the misalignment amount of the sub scanning moving amount can also be considered as an example of the operation of calculating the sub scanning moving amount.

The pattern used for the analysis in each adjustment item library 306 is not limited to the above pattern, and use of various patterns is considered. For example, as a pattern used for analysis in each adjustment item library 306, a pattern that is the identical or similar to a known pattern used for the identical or similar purpose may be used. In this case, the known pattern needs not be a pattern used for measurement in image processing as in this example, but may be a pattern for confirming the state by visual observation of the user or the like.

Next, the operation of adjustment (method for adjusting inkjet printer) of the printing apparatus 12 executed in the printing system 10 (see FIG. 1(*a*)) will be described.

Figure 6:
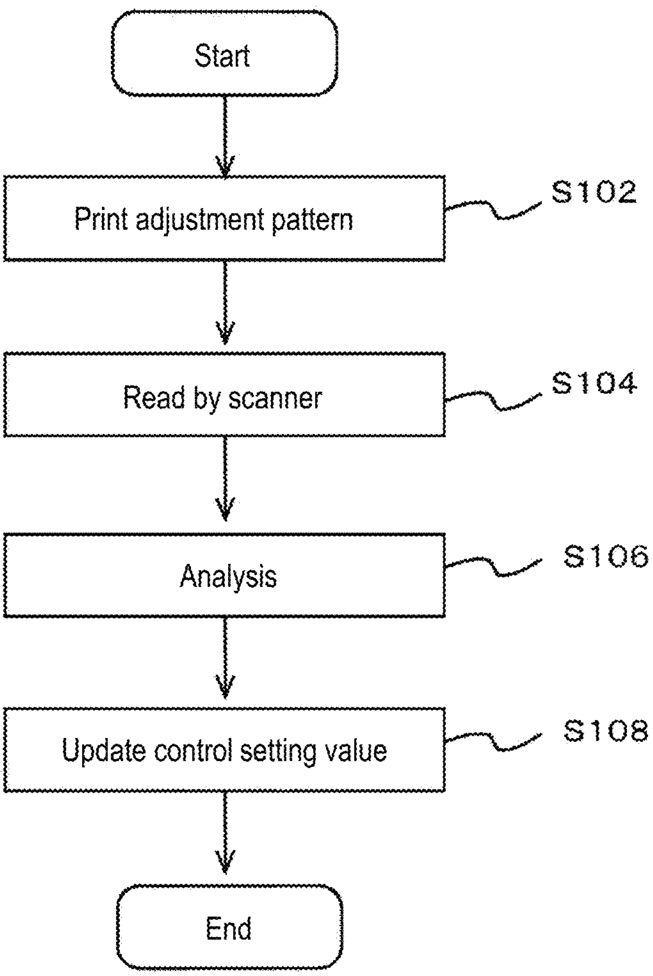
FIG. 6 is a flowchart showing an example of the operation of adjustment of the printing apparatus 12 executed in the printing system 10.

FIG. 6 is a flowchart showing an example of the operation of adjustment of the printing apparatus 12 executed in the printing system 10.

In the printing system 10, when adjusting the printing apparatus 12, first, the printing apparatus 12 is caused to print an adjustment pattern on the medium (step S102). The operation of step S102 is an example of the operation of the pattern printing stage. In step S102, the printing apparatus 12 executes printing of the adjustment pattern in response to an instruction of the MPC 18 (see FIG. 1(*a*)). The MPC 18 causes the printing apparatus 12 to print an adjustment pattern dynamically generated in accordance with the configuration of the printing apparatus 12. The MPC 18 causes the printing apparatus 12 to print, as the adjustment pattern an adjustment pattern generated in accordance with the item of adjustment to be executed. Due to this, the MPC 18 causes the printing apparatus 12 to print an adjustment pattern including a pattern corresponding to the adjustment item according to the adjustment item to be executed. For example, when the image analysis apparatus 16 (see FIG. 1(*a*)) performs analysis of the image in the adjustment item library 306 (see FIG. 3) for dot position analysis of the image analysis tool, the MPC 18 causes the printing apparatus 12 to print the adjustment pattern including the misalignment amount detection pattern 400.

As illustrated in FIGS. 5(*a*) and 5(*b*), it is conceivable to cause the printing apparatus 12 to print an adjustment pattern including a plurality of types of patterns respectively corresponding to a plurality of adjustment items. For example, the MPC 18 causes the printing apparatus 12 to print an adjustment pattern including a misalignment amount detection pattern and an attachment state detection pattern as such adjustment pattern. In this case, the attachment state detection pattern can be considered as a pattern or the like for detecting the attachment state, for example. The attachment state can be considered as a state or the like in which each inkjet head 202 is attached to the carriage 200 in the head unit 102 of the printing apparatus 12 (see FIG. 2(*a*)). The attachment state is a state detected by head tilt analysis, head front-rear analysis, and head stagger analysis, which are analyses related to mechanical adjustment among various analyses executed by the plurality of adjustment item libraries 306 in the image analysis tool. In this case, the attachment state detection pattern can be considered as a pattern or the like used for analysis in at least any of the adjustment item library 306 for head tilt analysis, for head front-rear analysis, and for head stagger analysis, for example. In this case, as the attachment state, the image analysis apparatus 16 detects at least any of the tilt of the inkjet head, the positional misalignment in a predetermined front-rear direction, and the positional misalignment in the staggered arrangement, for example.

Furthermore, in step S102, the MPC 18 may cause the printing apparatus 12 to print an adjustment pattern including a sub scanning moving amount detection pattern and a voltage detection pattern according to an item of adjustment to be executed. In this case, the sub scanning moving amount detection pattern can be considered as a pattern or the like for detecting the sub scanning moving amount. The voltage detection pattern can be considered as a pattern or the like for detecting the voltage of the drive signal received by each of the plurality of inkjet heads 202 in the printing apparatus 12. The sub scanning moving amount detection pattern can be considered as a pattern or the like used for analysis in the adjustment item library 306 for feed analysis. The voltage detection pattern can be considered as a pattern or the like used for analysis in the adjustment item library 306 for head voltage analysis.

In step S102, the printing apparatus 12 prints the adjustment pattern within a printing range of equal to or less than the A4 size, for example, onto the medium. With this configuration, a commercially available inexpensive PC scanner or the like can be used as the scanner 14 (see FIG. 1(*a*)). The printing apparatus 12 prints the adjustment pattern onto a medium having equal to or less than the A4 size smaller than the medium of the maximum size that can be held by the table unit 104. Specifically, in step S102, the printing apparatus 12 prints the adjustment pattern on an A4 size medium. Such operation can also be considered as an operation or the like of printing an adjustment pattern within a printing range narrower than a printable range in the printing apparatus 12. In this case, as the printable range in the printing apparatus 12, the maximum range or the like in which printing can be performed on the table unit 104 (see FIG. 1(*b*)) in the printing apparatus 12 can be considered.

Here, as the scanner 14, it is conceivable to use a scanner having a reading resolution of equal to or greater than 2400 dpi, for example. In this case, when the size of the adjustment pattern becomes, for example, equal to or greater than A3 size, it is conceivable that the size of the file generated by reading of the image by the scanner 14 becomes extremely large. Therefore, also in this regard, the range in which the adjustment pattern is printed is preferably the equal to or less than the A4 size. In this case, depending on the type of item of adjustment to be executed and the number of items, it is considered to be difficult to print all the necessary adjustment patterns on one medium having a size equal to or less than A4. In such case, a plurality of media of equal to or less than the A4 size may be used as necessary. In this case, the MPC 18 causes the printing apparatus 12 to print the adjustment pattern on each of the plurality of media. In this case, the MPC 18 can also be considered as a part of the adjustment pattern for the pattern to be printed on each medium. Such configuration can cause the printing apparatus 12 to print all necessary patterns by being divided into a plurality of media, even when all necessary patterns cannot be printed with one A4 size medium or the like.

After the printing apparatus 12 is caused to print the adjustment pattern in step S102, the medium on which the adjustment pattern is printed is read by the scanner 14, thereby generating a pattern image indicating the adjustment pattern (step S104), and the image analysis apparatus 16 performs analysis on the pattern image (step S106). The operation in step S104 is an example of the operation of the pattern reading stage. The operation in step S106 is an example of the operation of the analyzing stage. The operation of step S106 is also an example of the operation of causing the computer to perform analysis processing. The reading of the image by the scanner 14 in step S104 may be performed in an identical or similar manner to a known method for reading the image by the scanner 14, for example. In step S106, the image analysis apparatus 16 executes predetermined image processing, calculation, and the like as analysis on the pattern image. Due to this, the image analysis apparatus 16 performs calculation of a correction value used for control of the operation of the printing apparatus 12 and calculation of a numerical value indicating the state of the inkjet head in the printing apparatus 12.

After the calculation of the correction value is performed in step S106, update of the control setting value stored in the database 20 (see FIG. 1(*a*)) is performed based on the correction value (step S108). The operation in step S108 is an example of the operation of the setting value updating stage. The setting value updating stage can be considered as a stage or the like of updating at least a part of the control setting value based on the analysis result in the analyzing stage. The image analysis apparatus 16 outputs correction value data and an analysis result file based on the analysis result in step S106. Then, by the image analysis apparatus 16 or the other computer executing a program for managing information stored in the database 20, the database 20 is caused to store the correction value in based on the correction value data. By reading the adjustment pattern by the scanner 14 and executing predetermined image processing and calculation by the image analysis apparatus 16, it is possible to appropriately perform calculation of the correction value used for adjustment of the printing apparatus 12 and the like. By causing the database 20 to store the calculated correction value, it is possible to easily and appropriately perform the adjustment of the printing apparatus 12.

Figure 7:
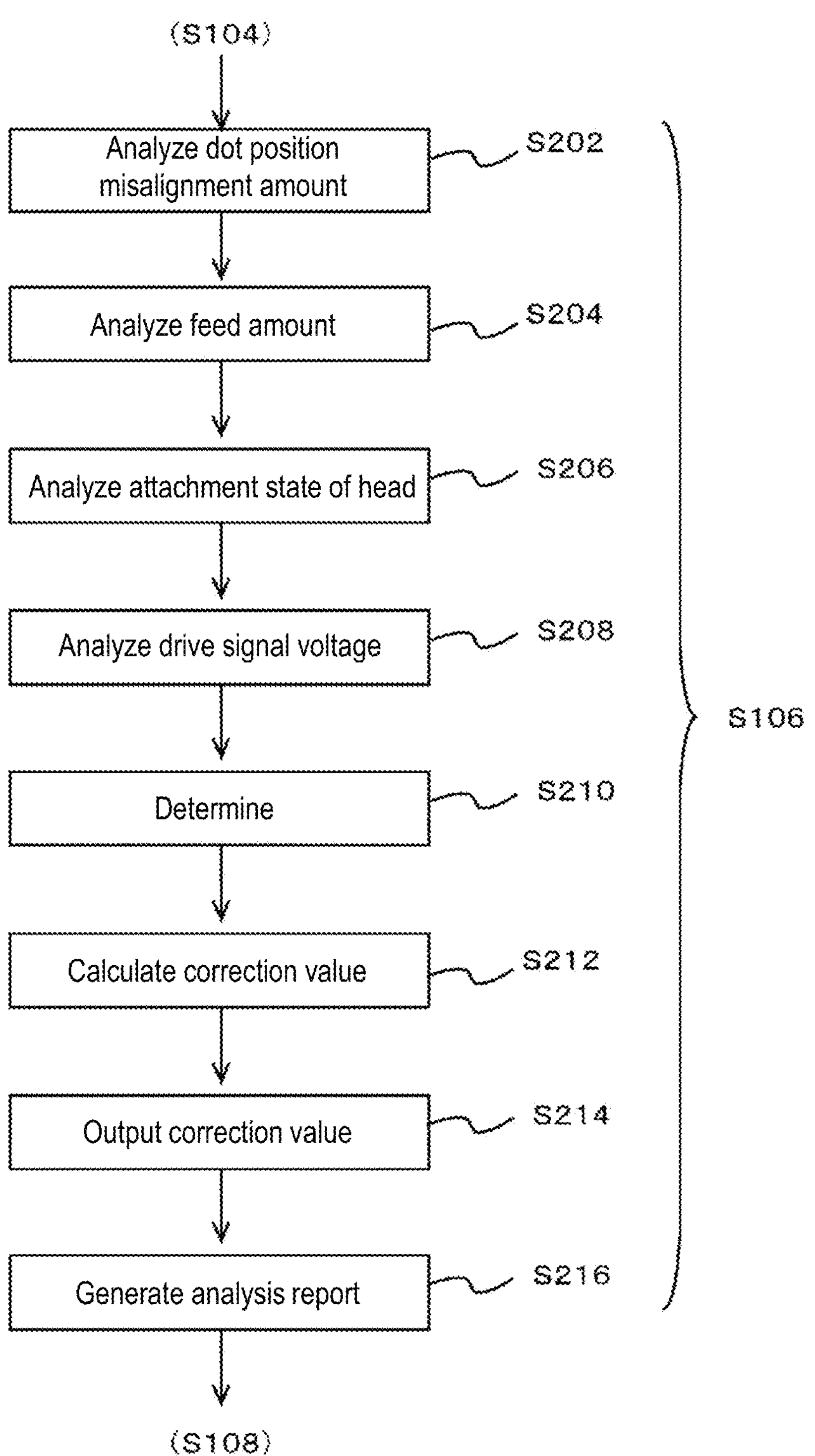
FIG. 7 is a flowchart showing an example of the operation of an image analysis apparatus 16 in step S106 in FIG. 6.

Among the operations in steps S102 to S108, it is conceivable to perform the analysis operation in step S106 as illustrated in FIG. 7.

FIG. 7 is a flowchart showing an example of the operation of the image analysis apparatus 16 (see FIG. 1(*a*)) in step S106 in FIG. 6. FIG. 7 more specifically shows an example of the numerical value calculated by the image analysis apparatus 16 in step S106 and the operation of the image analysis apparatus 16. The image analysis apparatus 16 is a computer that performs image analysis on a pattern image by performing image processing on the pattern image generated by reading of an adjustment pattern by the scanner 14 (see FIG. 1(*a*)), and performs calculation of a correction value and generation of an analysis result file (analysis report) by performing analysis of the pattern image by various adjustment item libraries 306 (see FIG. 3) in the image analysis tool. FIG. 7 illustrates an example of the operation of the image analysis apparatus 16 in a case of performing analysis of the pattern image using all of the plurality of adjustment item libraries 306 specifically illustrated in FIG. 3. In a modification of the operation of the image analysis apparatus 16, only a part of the operation shown in FIG. 7 may be executed according to the item of adjustment to be executed by the printing system 10.

In the operation shown in the flowchart of FIG. 7, the image analysis apparatus 16 executes analysis in the adjustment item library 306 for head tilt analysis, for head front-rear analysis, for head stagger analysis, for head voltage analysis, for dot position analysis, and for feed analysis in the image analysis tool based on the pattern image and the model parameter. Specifically, the image analysis apparatus 16 first performs analysis related to the dot position misalignment amount by the adjustment item library 306 for dot position analysis (step S202). In step S202, the image analysis apparatus 16 detects the dot position misalignment amount regarding the position of the ink dot formed on the medium by performing the above image processing based on the part indicating the misalignment amount detection pattern in the pattern image. Following the operation in step S202, the image analysis apparatus 16 performs analysis related to the sub scanning moving amount (feed amount) by the adjustment item library 306 for feed analysis (S204). In step S204, the image analysis apparatus 16 detects the sub scanning misalignment amount, which is the misalignment amount of the sub scanning moving amount, by the image processing executed based on the part indicating the sub scanning moving amount detection pattern in the pattern image. The operations in steps S202 and S204 are examples of the operation of the misalignment amount detecting stage. The operations of steps S202 and S204 are also examples of the operation of causing the computer to perform the misalignment amount detection processing.

Following the operation in step S204, the image analysis apparatus 16 performs analysis related to the attachment state of the plurality of inkjet heads 202 (see FIG. 2(*a*)) to the carriage 200 by the adjustment item library 306 for head tilt analysis, for head front-rear analysis, and for head stagger analysis (step S206). In this case, the adjustment item library 306 for head tilt analysis, for head front-rear analysis, and for head stagger analysis can be considered as the adjustment item library 306 for detecting the attachment state. In step S206, the image analysis apparatus 16 calculates an attachment state numerical value, which is a numerical value indicating the attachment state, by the image processing executed based on the part indicating the attachment state detection pattern in the pattern image. Specifically, by the adjustment item library 306 for head tilt analysis, for head front-rear analysis, and for head stagger analysis, the image analysis apparatus 16 performs analysis of the attachment angle of the inkjet head 202 with respect to the carriage 200, analysis of the position of each inkjet head 202 in the sub scanning direction, which becomes the front-rear direction, and analysis of the positional relationship in the front-rear direction between the inkjet heads 202 adjacent to each other in the staggered arrangement. As the attachment state numerical value, numerical values indicating the results of these analyses are calculated. Furthermore, following the operation in step S206, the image analysis apparatus 16 performs analysis of the voltage of the drive signal supplied to each inkjet head 202 by the adjustment item library 306 for head voltage analysis (step S208). In step S208, the image analysis apparatus 16 calculates a voltage-corresponding numerical value, which is a numerical value corresponding to the voltage of the drive signal received by each of the plurality of inkjet heads 202, by the image processing executed based on the part indicating the voltage detection pattern in the pattern image. The operations in steps S206 and S208 are examples of the operation of the numerical value calculating stage. The operations of steps S206 and S208 are also examples of the operation of causing the computer to perform the numerical value calculation processing.

Following the operations in steps S202 to S208, the image analysis apparatus 16 makes a determination on the analysis result (step S210). The operation in step S210 is an example of the operation of the determining stage. The operation of step S210 is also an example of the operation of causing the computer to perform the determination processing. In step S210, the image analysis apparatus 16 determines whether or not the dot position misalignment amount falls within the reference numerical value range of the dot position misalignment amount based on the analysis result in step S202. The reference numerical value range of the dot position misalignment amount can be considered as a reference numerical value range or the like set in advance for the dot position misalignment amount. The image analysis apparatus 16 determines whether or not the sub scanning moving amount falls within the reference numerical value range of the sub scanning moving amount based on the result of the analysis in step S204. The reference numerical value range of the sub scanning moving amount can be considered as a reference numerical value range or the like set in advance for the sub scanning moving amount. The image analysis apparatus 16 determines whether or not the attachment state numerical value falls within the reference numerical value range of the attachment state numerical value based on the result of the analysis in step S206. The reference numerical value range of the attachment state numerical value can be considered as a reference numerical value range or the like set in advance for the attachment state numerical value. In this case, the image analysis apparatus 16 determines whether or not the attachment state numerical value falls within the reference numerical value range for each of the attachment angle of the inkjet head 202, the position of each inkjet head 202 in the front-rear direction, and the positional relationship in the front-rear direction between the inkjet heads 202 adjacent to each other in the staggered arrangement. The image analysis apparatus 16 determines whether or not the voltage-corresponding numerical value falls within the reference numerical value range of the voltage-corresponding numerical value based on the result of the analysis in step S208. The reference numerical value range of the voltage-corresponding numerical value can be considered as a reference numerical value range or the like set in advance for the voltage-corresponding numerical value, for example.

After making the determination on the analysis result in step S210, the image analysis apparatus 16 calculates the correction value used for control of the operation of the printing apparatus 12 by the calculation executed based on the analysis result in at least a part of the adjustment item library 306 (step S212). The operation of step S212 is an example of the operation of the correction value calculating stage. The operation of step S212 is also an example of the operation of causing the computer to perform the correction value calculation processing. In step S212, based on the results of the analyses executed in steps S202 and S204, the image analysis apparatus 16 calculates a dot position correction value, which is a correction value corresponding to the dot position misalignment amount detected in step S202, and a sub scanning correction value, which is a correction value corresponding to the sub scanning misalignment amount detected in step S204. In this case, the dot position correction value and the sub scanning correction value can be considered as correction values or the like for controlling the operation of the printing apparatus 12 so as to reduce the dot position misalignment amount and the sub scanning misalignment amount. As the dot position correction value, it is conceivable to calculate a correction value for adjusting the timing of ejecting ink from the nozzle row. As the sub scanning correction value, it is conceivable to calculate a correction value for adjusting the sub scanning moving amount. After calculating the correction value, the image analysis apparatus 16 generates a file indicating the correction value in a predetermined format, thereby outputting correction value data (step S214). The correction value data is a file indicating the correction value. The image analysis apparatus 16 outputs the correction value data indicating at least the dot position correction value and the sub scanning correction value calculated in step S212.

As output indicating the result of the analysis executed by the image analysis apparatus 16, the image analysis apparatus 16 generates an analysis result file (analysis report) based on the analysis, the determination, the result of calculation of the correction value, and the like executed in steps S202 to S212 (step S216). The operation in step S216 is an example of the operation of the analysis result file generating stage. The operation of step S216 is also an example of the operation of causing the computer to perform the analysis result file generation processing. In step S216, as the analysis report, the image analysis apparatus 16 generates an analysis result file indicating the determination result of each evaluation item, the reference numerical value of the determination, the analysis result, and the like for a plurality of adjustment items performed on the printing apparatus 12. The image analysis apparatus 16 generates an analysis report indicating identification information for identifying the printing apparatus 12 used for printing of an adjustment pattern. Specifically, regarding the dot position misalignment amount, the analysis report indicates the determination result for the dot position misalignment amount in step S210, the reference numerical value range of the dot position misalignment amount, and the dot position misalignment amount for each of the plurality of nozzle rows in the printing apparatus 12. Regarding the sub scanning moving amount, the analysis report indicates the determination result on the sub scanning moving amount in step S210, the reference numerical value range of the sub scanning moving amount, and the sub scanning moving amount. Regarding the attachment state, the analysis report indicates, for each inkjet head 202, the determination result on the attachment state numerical value in step S210, the reference numerical value range of the attachment state numerical value, and the attachment state numerical value. Furthermore, regarding the voltage of the drive signal, the analysis report indicates, for each inkjet head 202, the determination result on the voltage-corresponding numerical value in step S210, the reference numerical value range of the voltage-corresponding numerical value, and the voltage-corresponding numerical value.

With the above operation, the image analysis apparatus 16 completes the operation in step S106 in FIG. 6. In the printing system 10, following the operation in step S106, the image analysis apparatus 16 or the other computer performs update of the control setting value stored in the database 20 (step S108). Specifically, the image analysis apparatus 16 or the other computer causes the database 20 to store, as at least a part of the control setting value, the correction values such as the dot position correction value and the sub scanning correction value based on the correction value data output in step S214. In step S108, at least a part of the control setting value is updated based on the result of the analysis executed in the image analysis apparatus 16. This configuration can appropriately reflect, in the operation of the printing apparatus 12, the correction value obtained by the image processing and calculation executed by the image analysis apparatus 16. The adjustment of the printing apparatus 12 can be appropriately performed. In this example, the detection of the dot position misalignment amount, the sub scanning moving amount, and the like, and the calculation of the dot position correction value, the sub scanning correction value, and the like are performed by image processing and calculation in the image analysis apparatus 16 without requiring manual work or the like by the user based on the adjustment pattern read by the scanner 14. Therefore, according to this example, regarding the adjustment corresponding to these correction values, it is possible to appropriately reduce the number of man-hours of adjustment, appropriately reduce an occurrence of a difference in a result of adjustment due to an individual difference of the user (adjuster) performing the adjustment, and the like.

The image analysis apparatus 16 generates an analysis report (analysis result file) in addition to the correction value data. In a case of this configuration, it is possible to more easily and appropriately manage the state of the printing apparatus 12 by using the analysis report. Specifically, by generating the analysis report indicating the identification information for identifying the printing apparatus 12 used for printing of the adjustment pattern, in the case of using a plurality of printing apparatuses 12 or the like, for example, it is possible to appropriately manage the state of each printing apparatus 12. It is also conceivable to use the analysis report as a proof (evidence) indicating that adjustment conforming to a predetermined specification range (adjustment to a level within the specification range) is performed on the printing apparatus 12.

Use of such analysis report makes it possible to appropriately adjust the printing apparatus 12 not by the method for causing the database 20 to automatically store the correction value but also for the adjustment item or the like for performing adjustment of the printing apparatus 12 manually by the user or the like. Specifically, for example, it is conceivable to perform manual adjustment by the user of the attachment state of the inkjet head 202. In this case, by determining the suitability of the attachment state of each inkjet head 202, and generating the analysis report indicating the result, it is possible to easily and appropriately determine the suitability of the attachment state of each inkjet head 202 based on an objective numerical value. Therefore, according to this example, for at least a part of the adjustment performed on the printing apparatus 12, it is possible to determine the suitability of the adjustment level on the numerical value basis, and numerically manage the adjustment level. It is possible to more appropriately reduce an occurrence of a difference in the adjustment result due to an individual difference of the adjuster performing the adjustment. For example, it is also conceivable to perform manual adjustment by the user of the voltage of the drive signal supplied to each inkjet head 202. In this example, it is possible to appropriately check, by the numerical value, the voltage of the drive signal received by each inkjet head 202, for example. It is possible to appropriately determine the suitability of the adjustment level on a numerical value basis, for example, when adjusting the voltage of the drive signal.

Furthermore, in this example, the analysis report indicates numerical values calculated from the determination result, the reference numerical value range, and the adjustment pattern also for the adjustment items subjected to calculation of the correction values such as the dot position misalignment amount and the sub scanning moving amount. In this case, also for the dot position misalignment amount and the sub scanning moving amount, adjustment is not performed by simply causing the database 20 to store the correction value but the adjustment level can be numerically managed. In this case, in a case where, for example, the analysis report is used as evidence of adjustment or the like, it becomes possible to more appropriately indicate the state of the printing apparatus 12.

Thus, according to this example, the adjustment with respect to the printing apparatus 12 can be easily and appropriately performed. The printing apparatus 12 can more appropriately perform high-speed printing, high resolution printing, and the like. For example, high quality printing can be more appropriately performed even in a case where it is particularly important to have the timing of ink ejection from each nozzle row, such as a case of performing printing at high speed on a wide medium and a case of performing printing with high image quality on a medium having permeability. In this example, by performing the image processing on the pattern image generated by reading of the image by the scanner 14, and causing the database 20 to automatically store the correction value, it becomes possible to appropriately perform, in a short time, adjustment of the timing of causing each inkjet head 202 to eject the ink, and the like.

The configuration and operation of each unit of the printing system 10 and the printing apparatus 12 are not limited to the specific configuration and operation described above, and various changes can be made. For example, the operation of the flowchart shown in FIG. 7 may be modified so as to perform only analysis corresponding to some adjustment items according to necessary adjustment items. The order of performing analysis corresponding to each adjustment item may be different from the order described above. Analysis corresponding to a plurality of adjustment items may be performed simultaneously. The image analysis apparatus 16 may be configured by a plurality of computers.

It is conceivable that also the pattern used in various analyses is appropriately changed in accordance with the configuration and the like of each unit of the printing system 10 and the printing apparatus 12. As the inkjet head 202 in the printing apparatus 12, it is also conceivable to use a configuration (hereinafter, called multivalued head) in which the volume of ink ejected from each nozzle, for example, can be changed in a plurality of stages. In this case, it is also conceivable to cause the printing apparatus 12 to draw the misalignment amount detection pattern 400 including the individual multiple line 402 for each volume of ink. It is conceivable to cause the printing apparatus 12 to draw a pattern having the configuration illustrated in FIG. 8, for example, for each nozzle row in the misalignment amount detection pattern 400.

Figure 8:
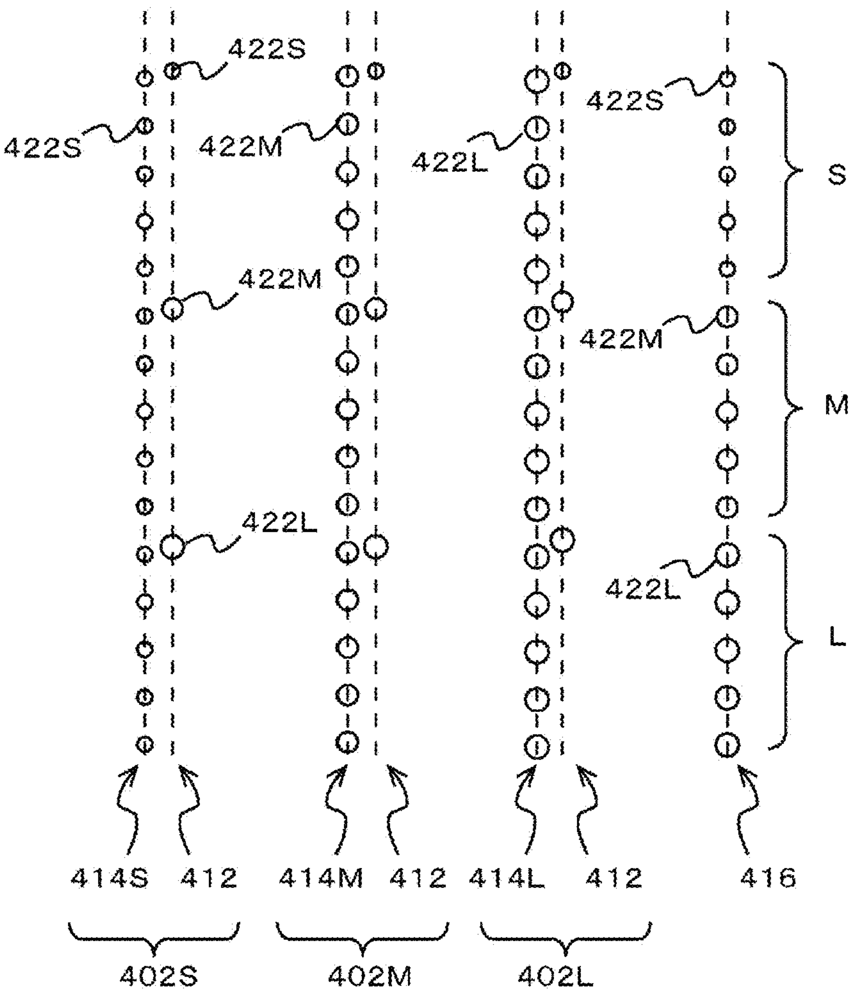
FIG. 8 is a view describing a misalignment amount detection pattern 400 when a multivalued head is used.

FIG. 8 is a view describing the misalignment amount detection pattern 400 in a case of using the multivalued head, and illustrates an example of a pattern drawn corresponding to one nozzle row in the misalignment amount detection pattern 400. For the pattern illustrated in FIG. 8, it is also conceivable a pattern or the like constituting a part of a modification of the misalignment amount detection pattern 400, for example. In the case of using the pattern illustrated in FIG. 8, in the operation of causing the printing apparatus 12 (see FIG. 1(*a*)) to print the adjustment pattern on the medium, for each nozzle row other than the reference nozzle row, the inkjet printer is caused to draw a multiple line for each volume of ink of a plurality of stages. Specifically, FIG. 8 illustrates an example of a pattern that the printing apparatus 12 is caused to draw corresponding to one nozzle row for a case of using the inkjet head 202 in which the volume of ink can be changed with three stages of volumes. In this case, by performing ejection of the ink in three stages different from one another, the inkjet head 202 forms a small-size dot 422S, a medium-size dot 422M, and a large-size dot 422L on the medium as ink dots according to the volume of each ink. As the multiple line for each ink volume, as illustrated in FIG. 8, the printing apparatus 12 is caused to draw a plurality of multiple lines 402S, 402M, and 402L.

In this case, the multiple line 402S includes the reference nozzle line 412 and an adjustment nozzle line 414S. The multiple line 402M includes the reference nozzle line 412 and an adjustment nozzle line 414M. The multiple line 402L includes the reference nozzle line 412 and an adjustment nozzle line 414L. The printing apparatus 12 draws, as the reference nozzle line 412 in each of the multiple lines 402S, 402M, and 402L, a line in which ink dots of a plurality of types of sizes corresponding to the respective volumes of ink of the plurality of stages are lined by the reference nozzle row. The reference nozzle line 412 can be considered as a line or the like drawn using ink dots of a plurality of types of sizes such as the dot 422S, the dot 422M, and the dot 422L illustrated in FIG. 8, for example. The printing apparatus 12 draws, as each of the adjustment nozzle lines 414S, 414M, and 414L, a line in which only ink dots of a size corresponding to the volume of one type of ink are lined by the nozzle row other than the reference nozzle row. More specifically, in the case illustrated in FIG. 8, the adjustment nozzle line 414S in the multiple line 402S is a line in which only the small-sized dots 422S are lined. The adjustment nozzle line 414M in the multiple line 402M is a line in which only the middle-size dots 422M are lined. The adjustment nozzle line 414L in the multiple line 402L is a line in which only the large-sized dots 422L are lined. Such configuration can cause the printing apparatus 12 to appropriately print the pattern for detecting the dot position misalignment amount for each volume of ink. In this case, the image analysis apparatus 16 (see FIG. 1(*a*)) performs detection of the dot position misalignment amount, calculation of the dot position correction value, and the like for each volume of ink. Such configuration can more appropriately perform adjustment and the like of the printing apparatus 12 when using the multivalued head as the inkjet head 202.

In the pattern illustrated in FIG. 8, in addition to the multiple line 402S, 402M, and 402L for each volume of ink, a mixing line 416 is further drawn by the nozzle row drawing the adjustment nozzle lines 414S, 414M, and 414L in the multiple lines 402S, 402M, and 402L. In this case, the mixing line 416 is a line in which ink dots of a plurality of types of sizes are lined, which is drawn by the nozzle row drawing the adjustment nozzle lines 414S, 414M, and 414L. The mixing line 416 is a line drawn with each nozzle row other than the reference nozzle row, and can be considered as a line or the like in which ink dots of a plurality of types of sizes corresponding to the respective volumes of ink of the plurality of stages are lined. In this case, it can also be considered that four lines, more than by one the type of ink dot size, are drawn by each nozzle row other than the reference nozzle row. By causing the printing apparatus 12 to draw such the mixing line 416, it is possible to more appropriately check the influence of the difference in size and the like for the ink dots 422S, 422M, and 422L formed in the same nozzle row, for example. The mixing line 416 includes dots of a plurality of types of sizes such that a plurality of dots of the same size, for example, are continuously lined in the sub scanning direction. Such configuration makes it possible to more appropriately check the influence of the difference in size of the ink dot and the like.

In the printing system 10, the printing apparatus 12, and the like, various changes can be made also in other points. In this example, the configuration and operation using the scanner 14 for reading the adjustment pattern printed on the medium by the printing apparatus 12 have been described. In this case, reading of the adjustment pattern can be easily and appropriately performed without providing the printing apparatus 12 with a special configuration or the like for reading the image. For example, it becomes possible to use a commercially available inexpensive PC scanner or the like. However, in a modification of the printing system 10, it is also conceivable to perform reading of the adjustment pattern using an image reading apparatus other than the scanner 14. For example, when using the printing apparatus 12 having a configuration for reading an image, it is also conceivable to perform reading of the adjustment pattern with this configuration. Depending on the accuracy required for adjustment and the like, it is also conceivable to perform reading of the adjustment pattern using a camera function of a digital camera or a smartphone.

The printing apparatus 12 is an inkjet printer. In this case, the printing apparatus 12 can be considered as a configuration or the like of drawing a two-dimensional (2D) image by ejecting ink onto a medium. In a modification of the printing apparatus 12, it is also conceivable to use a 3D printer (3D printing apparatus) or the like that shapes a stereoscopic shaped object as the printing apparatus 12, for example. In this case, it is conceivable to cause the printing apparatus 12 to perform the operation of drawing a two-dimensional image on the medium using the medium that is a printing target only in a case of performing adjustment on the printing apparatus 12. Also in a case of this configuration, the adjustment of the printing apparatus 12 can be appropriately performed.

INDUSTRIAL APPLICABILITY

This disclosure can be suitably used also for a method for adjusting an inkjet printer.

The invention claimed is:

1. A method for adjusting an inkjet printer that performs adjustment for the inkjet printer, the method comprising:

a pattern printing stage of causing the inkjet printer to print a predetermined test pattern on a medium;

a pattern reading stage of generating a pattern image that is an image indicating the test pattern by reading, with a scanner, the medium on which the test pattern is printed in the pattern printing stage;

an analyzing stage of performing analysis on the pattern image by a computer; and a setting value updating stage of updating a control setting value stored in a setting value storage that stores the control setting value that is a setting value for controlling an operation of the inkjet printer, the setting value updating stage of updating at least a part of the control setting value based on a result of analysis in the analyzing stage, wherein the inkjet printer includes a plurality of inkjet heads each having a nozzle row in which a plurality of nozzles are arranged with positions in a predetermined nozzle row direction misaligned from one another, a main scan driving unit that causes the plurality of inkjet heads to perform a main scan of ejecting ink while relatively moving with respect to the medium in a main scanning direction set in advance, and a drive signal output unit that outputs a drive signal for causing the plurality of inkjet heads to eject ink, the main scan driving unit causes the plurality of inkjet heads to perform the main scan based on the control setting value stored in the setting value storage, and in the pattern printing stage, causing the inkjet printer to print the test pattern including a pattern for ejecting ink from a plurality of the nozzle rows with respect to a same position in the main scanning direction and a voltage detection pattern, which is a pattern for detecting a voltage of the drive signal received by each of the plurality of inkjet heads, the analyzing stage includes a misalignment amount detecting stage of detecting, by image processing executed by the computer based on the pattern image, a dot position misalignment amount that is, regarding a position of a dot of ink formed on the medium by ejecting ink from the nozzle included in each of a plurality of the nozzle rows in the plurality of inkjet heads, a misalignment amount of a position of the dot occurring in each of the nozzle rows, and a correction value calculating stage of calculating, by calculation executed the computer, a dot position correction value that is a correction value corresponding to the dot position misalignment amount detected in the misalignment amount detecting stage, and in the setting value updating stage, by causing the setting value storage to store, as at least a part of the control setting value, the dot position correction value calculated in the correction value calculating stage, at least a part of the control setting value is updated based on a result of analysis in the analyzing stage.

2. The method for adjusting an inkjet printer, the method as set forth in claim 1, wherein each of the plurality of inkjet heads includes a plurality of the nozzle rows, in the pattern printing stage, any one of the nozzle rows in any one of the inkjet heads is selected as a reference nozzle row, and as a pattern for ejecting ink from a plurality of the nozzle rows to a same position in the main scanning direction, the inkjet printer is caused to print, for each of the nozzle rows other than the reference nozzle row, a pattern for ejecting ink from two nozzle rows including each of the reference nozzle row and a nozzle row other than the reference nozzle row to a same position in the main scanning direction.

3. The method for adjusting an inkjet printer, the method as set forth in claim 2, wherein a pattern of ejecting ink from a plurality of the nozzle rows to a same position in the main scanning direction is a pattern of a multiple line in which a plurality of lines are drawn at a same position in design in the main scanning direction by drawing, with ink ejected from each of the nozzle rows, a line extending in a direction orthogonal to the main scanning direction, the inkjet head can change, in a plurality of stages, a volume of ink ejected from each of the nozzles, and in the pattern printing stage, for each of the nozzle rows other than the reference nozzle row, the inkjet printer is caused to draw the multiple line for each volume of ink of the plurality of stages.

4. The method for adjusting an inkjet printer, the method as set forth in claim 3, wherein the multiple line drawn for each volume of ink of the plurality of stages corresponding to the respective nozzle rows other than the reference nozzle row includes a reference nozzle line that is a line drawn with the reference nozzle row, and an adjustment nozzle line that is a line drawn by the nozzle row other than the reference nozzle row, and in the pattern printing stage, as the multiple line corresponding to each volume of ink, the inkjet printer is caused to draw the reference nozzle line in which ink dots of a plurality of types of sizes corresponding to respective volumes of ink of the plurality of stages are lined, and the adjustment nozzle line in which only ink dots of a size corresponding to a volume of one type of ink are lined.

5. The method for adjusting an inkjet printer, the method as set forth in claim 4, wherein in the pattern printing stage, for each of the nozzle rows other than the reference nozzle row, the inkjet printer is further caused to draw a line that is drawn with each of the nozzle rows, the line in which ink dots of a plurality of types of sizes corresponding to respective volumes of ink of the plurality of stages are lined.

6. The method for adjusting an inkjet printer, the method as set forth in claim 5, wherein the inkjet printer further includes a carriage that holds the plurality of inkjet heads, a pattern of ejecting ink from a plurality of the nozzle rows to a same position in the main scanning direction is a misalignment amount detection pattern for detecting the dot position misalignment amount in the misalignment amount detecting stage, in the pattern printing stage, the inkjet printer is caused to print the test pattern including the misalignment amount detection pattern, and an attachment state detection pattern that is a pattern for detecting an attachment state, which is a state in which each of the inkjet heads is attached to the carriage, and the analyzing stage further includes a numerical value calculating stage of calculating an attachment state numerical value, which is a numerical value indicating the attachment state, by image processing executed by the computer based on a part indicating the attachment state detection pattern in the pattern image, a determining stage of determining whether or not the attachment state numerical value falls within a reference numerical value range set in advance for the attachment state numerical value, and an analysis result file generating stage of generating an analysis result file, which is a file indicating a result of determination in the determining stage.

7. The method for adjusting an inkjet printer, the method as set forth in claim 2, wherein the inkjet printer further includes a carriage that holds the plurality of inkjet heads, a pattern of ejecting ink from a plurality of the nozzle rows to a same position in the main scanning direction is a misalignment amount detection pattern for detecting the dot position misalignment amount in the misalignment amount detecting stage, in the pattern printing stage, the inkjet printer is caused to print the test pattern including the misalignment amount detection pattern, and an attachment state detection pattern that is a pattern for detecting an attachment state, which is a state in which each of the inkjet heads is attached to the carriage, and the analyzing stage further includes a numerical value calculating stage of calculating an attachment state numerical value, which is a numerical value indicating the attachment state, by image processing executed by the computer based on a part indicating the attachment state detection pattern in the pattern image, a determining stage of determining whether or not the attachment state numerical value falls within a reference numerical value range set in advance for the attachment state numerical value, and an analysis result file generating stage of generating an analysis result file, which is a file indicating a result of determination in the determining stage.

8. The method for adjusting an inkjet printer, the method as set forth in claim 3, wherein the inkjet printer further includes a carriage that holds the plurality of inkjet heads, a pattern of ejecting ink from a plurality of the nozzle rows to a same position in the main scanning direction is a misalignment amount detection pattern for detecting the dot position misalignment amount in the misalignment amount detecting stage, in the pattern printing stage, the inkjet printer is caused to print the test pattern including the misalignment amount detection pattern, and an attachment state detection pattern that is a pattern for detecting an attachment state, which is a state in which each of the inkjet heads is attached to the carriage, and the analyzing stage further includes a numerical value calculating stage of calculating an attachment state numerical value, which is a numerical value indicating the attachment state, by image processing executed by the computer based on a part indicating the attachment state detection pattern in the pattern image, a determining stage of determining whether or not the attachment state numerical value falls within a reference numerical value range set in advance for the attachment state numerical value, and an analysis result file generating stage of generating an analysis result file, which is a file indicating a result of determination in the determining stage.

9. The method for adjusting an inkjet printer, the method as set forth in claim 4, wherein the inkjet printer further includes a carriage that holds the plurality of inkjet heads, a pattern of ejecting ink from a plurality of the nozzle rows to a same position in the main scanning direction is a misalignment amount detection pattern for detecting the dot position misalignment amount in the misalignment amount detecting stage, in the pattern printing stage, the inkjet printer is caused to print the test pattern including the misalignment amount detection pattern, and an attachment state detection pattern that is a pattern for detecting an attachment state, which is a state in which each of the inkjet heads is attached to the carriage, and the analyzing stage further includes a numerical value calculating stage of calculating an attachment state numerical value, which is a numerical value indicating the attachment state, by image processing executed by the computer based on a part indicating the attachment state detection pattern in the pattern image, a determining stage of determining whether or not the attachment state numerical value falls within a reference numerical value range set in advance for the attachment state numerical value, and an analysis result file generating stage of generating an analysis result file, which is a file indicating a result of determination in the determining stage.

10. The method for adjusting an inkjet printer, the method as set forth in claim 1, wherein the inkjet printer further includes a carriage that holds the plurality of inkjet heads, a pattern of ejecting ink from a plurality of the nozzle rows to a same position in the main scanning direction is a misalignment amount detection pattern for detecting the dot position misalignment amount in the misalignment amount detecting stage, in the pattern printing stage, the inkjet printer is caused to print the test pattern including the misalignment amount detection pattern, and an attachment state detection pattern that is a pattern for detecting an attachment state, which is a state in which each of the inkjet heads is attached to the carriage, and the analyzing stage further includes a numerical value calculating stage of calculating an attachment state numerical value, which is a numerical value indicating the attachment state, by image processing executed by the computer based on a part indicating the attachment state detection pattern in the pattern image, a determining stage of determining whether or not the attachment state numerical value falls within a reference numerical value range set in advance for the attachment state numerical value, and an analysis result file generating stage of generating an analysis result file, which is a file indicating a result of determination in the determining stage.

11. The method for adjusting an inkjet printer, the method as set forth in claim 10, wherein in the determining stage, whether or not the dot position misalignment amount falls within a reference numerical value range set in advance with respect to the dot position misalignment amount is further determined, and in the analysis result file generating stage, the analysis result file further showing a result of determination related to the dot position misalignment amount is generated.

12. The method for adjusting an inkjet printer, the method as set forth in claim 11, wherein the analysis result file is generated, the analysis result file indicating, in the analysis result file generating stage, identification information for identifying the inkjet printer used for printing of the test pattern, indicating, for each of the nozzle rows, a result of determination on the dot position misalignment amount in the determining stage, a reference numerical value range set in advance for the dot position misalignment amount, and the dot position misalignment amount, and indicating, for each of the inkjet heads, a result of determination on the attachment state numerical value in the determining stage, a reference numerical value range set in advance for the attachment state numerical value, and the attachment state numerical value.

13. The method for adjusting an inkjet printer, the method as set forth in claim 10, wherein in the numerical value calculating stage, a voltage-corresponding numerical value, which is a numerical value corresponding to a voltage of the drive signal received by each of the plurality of inkjet heads, is further calculated by image processing executed by the computer based on a part indicating the voltage detection pattern in the pattern image, in the determining stage, whether or not the voltage-corresponding numerical value falls within a reference numerical value range set in advance for the voltage-corresponding numerical value further determined, and in the analysis result file generating stage, the analysis result file further indicating a result of determination related to the voltage-corresponding numerical value is generated.

14. The method for adjusting an inkjet printer, the method as set forth in claim 1, wherein the inkjet printer further includes a sub scan driving unit that causes the plurality of inkjet heads to perform a sub scan of relatively moving with respect to the medium in a sub scanning direction orthogonal to the main scanning direction, in the pattern printing stage, the inkjet printer is caused to print the test pattern further including a sub scanning moving amount detection pattern, which is a pattern for detecting a sub scanning moving amount, which is a moving amount by which the plurality of inkjets relatively move with respect to the medium in the sub scan, in the misalignment amount detecting stage, a sub scanning misalignment amount, which is a misalignment amount of the sub scanning moving amount, is further detected by image processing executed by the computer based on a part indicating the sub scanning moving amount detection pattern in the pattern image, in the correction value calculating stage, a sub scanning correction value, which is a correction value corresponding to the sub scanning misalignment amount detected in the misalignment amount detecting stage, is further calculated by calculation executed by the computer, and in the setting value updating stage, the setting value storage is caused to further store, as at least a part of the control setting value, the sub scanning correction value calculated in the correction value calculating stage.

15. The method for adjusting an inkjet printer, the method as set forth in claim 1, wherein in the pattern reading stage, using the scanner having a maximum readable document size of equal to or less than an A4 size, in the pattern printing stage, the inkjet printer is caused to print the test pattern within a printing range of equal to or less than an A4 size.

16. A program for causing a computer to perform image analysis, the program, wherein the computer is caused to perform analysis processing of performing analysis on a pattern image that is an image generated by reading, with a scanner, a predetermined test pattern printed on a medium by an inkjet printer, the inkjet printer includes a plurality of inkjet heads each having a nozzle row in which a plurality of nozzles are arranged with positions in a predetermined nozzle row direction misaligned from one another, a main scan driving unit that causes the plurality of inkjet heads to perform a main scan of ejecting ink while relatively moving with respect to the medium in a main scanning direction set in advance, and a drive signal output unit that outputs a drive signal for causing the plurality of inkjet heads to eject ink, the main scan driving unit causes the plurality of inkjet heads to perform the main scan based on the control setting value stored in a setting value storage that stores a control setting value, which is a setting value for controlling operation of the inkjet printer, the test pattern includes a pattern for ejecting ink from the plurality of nozzle rows to a same position in the main scanning direction and a voltage detection pattern, which is a pattern for detecting a voltage of the drive signal received by each of the plurality of inkjet heads, and in the analysis processing, the computer is caused to perform misalignment amount detection processing of detecting a dot position misalignment amount that is a misalignment amount of a position of the dot occurring in each of the nozzle rows by image processing executed based on the pattern image, for a position of a dot of ink formed on the medium by ejecting ink from the nozzle included in each of the plurality of nozzle rows in the plurality of inkjet heads, and correction value calculation processing of calculating, by calculation, a dot position correction value, which is a correction value corresponding to the dot position misalignment amount detected by the misalignment amount detection processing.

17. A printing system that performs printing with an inkjet method, the printing system comprising:

an inkjet printer that performs printing with an inkjet method;

a scanner that performs reading of an image;

an image analysis apparatus that performs an analysis of an image; and a setting value storage that stores a control setting value, which is a setting value for controlling operation of the inkjet printer, wherein the inkjet printer includes a plurality of inkjet heads each having a nozzle row in which a plurality of nozzles are arranged with positions in a predetermined nozzle row direction misaligned from one another, a main scan driving unit that causes the plurality of inkjet heads to perform a main scan of ejecting ink while relatively moving with respect to a medium in a main scanning direction set in advance, and a drive signal output unit that outputs a drive signal for causing the plurality of inkjet heads to eject ink, the main scan driving unit causes the plurality of inkjet heads to perform the main scan based on the control setting value stored in the setting value storage, at a time of adjustment for performing adjustment on the inkjet printer, the inkjet printer prints a predetermined test pattern on the medium, the scanner reads the medium on which the test pattern is printed, the image analysis apparatus performs analysis on a pattern image that is an image indicating the test pattern, the image being generated by reading, with the scanner, the medium on which the test pattern is printed, the test pattern includes a pattern for ejecting ink from a plurality of the nozzle rows to a same position in the main scanning direction and a voltage detection pattern, which is a pattern for detecting a voltage of the drive signal received by each of the plurality of inkjet heads, in analysis processing of performing analysis on the pattern image, the image analysis apparatus performs misalignment amount detection processing of detecting a dot position misalignment amount that is a misalignment amount of a position of the dot occurring in each of the nozzle rows by image processing executed based on the pattern image, for a position of a dot of ink formed on the medium by ejecting ink from the nozzle included in each of the plurality of nozzle rows in the plurality of inkjet heads, and correction value calculation processing of calculating, by calculation, a dot position correction value, which is a correction value corresponding to the dot position misalignment amount detected by the misalignment amount detection processing, and by causing the setting value storage to store the dot position correction value calculated in the correction value calculation processing as at least a part of the control setting value at least a part of the control setting value is updated based on a result of analysis in the analysis processing.

* * * * *